United States Patent
Bae et al.

(10) Patent No.: US 11,113,268 B2
(45) Date of Patent: Sep. 7, 2021

(54) METHOD AND DEVICE FOR RESTORING MISSING OPERATIONAL DATA

(71) Applicant: Pusan National University Industry-University Cooperation Foundation, Busan (KR)

(72) Inventors: Hye Rim Bae, Busan (KR); Sung Hyun Sim, Gyeongju-si (KR); Yu Lim Choi, Busan (KR); Riska Asriana Sutrisnowati, Busan (KR)

(73) Assignee: PUSAN NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 25 days.

(21) Appl. No.: 16/702,539

(22) Filed: Dec. 4, 2019

(65) Prior Publication Data

US 2020/0210406 A1 Jul. 2, 2020

(30) Foreign Application Priority Data

Dec. 27, 2018 (KR) .................. 10-2018-0170893

(51) Int. Cl.
G06F 16/23 (2019.01)

(52) U.S. Cl.
CPC ...... *G06F 16/2365* (2019.01); *G06F 16/2379* (2019.01)

(58) Field of Classification Search
CPC .................. G06F 16/2365; G06F 16/2379
See application file for complete search history.

(56) References Cited

U.S. PATENT DOCUMENTS 6,615,367 B1 * 9/2003 Unkle ................ G05B 23/0229
706/46
7,650,367 B2 * 1/2010 Arruza ................ G06F 11/1658
707/999.202

(Continued)

FOREIGN PATENT DOCUMENTS

JP          2010146260 A      7/2010
KR         101341386 B1      12/2013
(Continued)

OTHER PUBLICATIONS

Bertoli, Piergiorgio, et al. "Reasoning-based techniques for dealing with incomplete business process execution traces." Congress of the Italian Association for Artificial Intelligence. Springer, Cham, 2013. (Year: 2013).*

(Continued)

*Primary Examiner* — Mohsen Almani
(74) *Attorney, Agent, or Firm* — Cantor Colburn LLP

(57) ABSTRACT

Disclosed are a device and a method for restoring missing operational data. The method for restoring missing operational data includes determining whether missing data is present in a first event defining operational data or a first resource constituting the operational data, extracting candidate data from a missing table, depending on a form in which the first resource is defined by the first event and a location where the missing data is identified, and processing the candidate data to restore the missing data, based on a predetermined restoration scheme.

18 Claims, 8 Drawing Sheets

(56) References Cited

U.S. PATENT DOCUMENTS

| | | | |
|---|---|---|---|
| 8,918,371 B1 * | 12/2014 | Prikhodko | G06F 11/3476 |
| | | | 706/12 |
| 2013/0006949 A1 * | 1/2013 | Essawi | G06F 11/0751 |
| | | | 707/703 |
| 2016/0371132 A1 * | 12/2016 | Prabhakara | G06F 11/079 |

FOREIGN PATENT DOCUMENTS

| | | | |
|---|---|---|---|
| KR | 1020140121997 A | 10/2014 | |
| KR | 1020180073861 A | 7/2018 | |

OTHER PUBLICATIONS

Rogge-Solti, Andreas, et al. "Repairing event logs using stochastic process models." vol. 78. Universitätsverlag Potsdam, 2013. (Year: 2013).*

GrammerBook.com, "What About and/or?"; https://data.grammarbook.com/blog/effective-writing/what-about-andor; Posted on Tuesday, Oct. 28, 2014, at 6:58 pm (Year: 2014).*

Melissa J. Azur et al., "Multiple Imputation by Chained Equations: What is it and how does it work?", Int J Methods Psychiatr Res., Mar. 2011, 14 pages, doi:10.1002/mpr.329.

Sunghyun Sim et al., "MIEC: Repair Missing Data in Imperfect Event Log", Jun. 2019, 16 pages.

* cited by examiner

FIG. 2

| | Operational data | | Non-missing operational data | |
|---|---|---|---|---|
| | First event 210 | First resource 220 | Second event 230 | Second resource 240 |
| Type E1R1-E 211 | E₁ E₂ ○ E₄ ← Missing data 212 | R₁ R₂ R₃ R₄ R₅ | E₁ E₂ E₃ E₄ ← Data for restoration 213 | R₁ R₂ R₃ R₄ R₅ |
| Type E1R1-R 221 | E₁ E₂ E₃ E₄ | R₁ __ R₃ R₄ R₅ ← Missing data 222 | E₁ E₂ E₃ E₄ | R₁ R₂ R₃ R₄ R₅ ← Data for restoration 223 |
| Type E1R1-A 231 | E₁ E₂ ○ E₄ ← Missing data 1 232 | R₁ __ R₃ R₄ R₅ ← Missing data 2 233 | E₁ E₂ E₃ E₄ ← Data for restoration of missing data 1 234 | R₁ R₂ R₃ R₄ R₅ ← Data for restoration of missing data 2 235 |
| | | | E₂ E₃ E₄ E₅ ← Data for restoration of missing data 1 234 | R₁ R₃ R₄ R₅ R₆ |

FIG. 3

| | Operational data | | Non-missing operational data | |
|---|---|---|---|---|
| | First event 310 | First resource 320 | Second event 330 | Second resource 340 |
| Type EMR1-E 311 | $E_1$ $E_2$ (missing) $E_4$ / $E_2$ (missing) $E_4$ $E_5$ ← Missing data 312 | $R_1$ $R_2$ $R_3$ $R_4$ $R_5$ | $E_1$ $E_2$ [$E_3$] $E_4$ ← Data for restoration 313 | $R_1$ $R_2$ $R_3$ $R_4$ $R_5$ |
| Type EMR1-R 321 | $E_2$ $E_3$ $E_4$ $E_5$ | $R_1$ (missing) $R_3$ $R_4$ $R_5$ ← Missing data 322 | $E_1$ $E_2$ $E_3$ $E_4$ | $R_1$ [$R_2$] $R_3$ $R_4$ $R_5$ ← Data for restoration 323 |
| Type EMR1-A 331 | $E_1$ $E_2$ (missing) $E_4$ / $E_2$ (missing) $E_4$ $E_5$ ← Missing data 1 332 | $R_1$ (missing) $R_3$ $R_4$ $R_5$ ← Missing data 2 333 | $E_1$ $E_2$ [$E_3$] $E_4$ / $E_2$ [$E_3$] $E_4$ $E_5$ ← Data for restoration of missing data 1 334 | $R_1$ [$R_2$] $R_3$ $R_4$ $R_5$ / $R_1$ $R_3$ $R_4$ $R_5$ $R_6$ ← Data for restoration of missing data 2 335 |

FIG. 5

| | Operational data | | Non-missing operational data | |
|---|---|---|---|---|
| | First event 510 | First resource 520 | Second event 530 | Second resource 540 |
| Type EMRM-E 511 | $E_2$ $E_1$ $E_2$ $E_4$ $E_5$ $E_4$ ← Missing data 512 | $R_1$ $R_2$ $R_3$ $R_4$ $R_5$ <br> $R_1$ $R_3$ $R_4$ $R_5$ $R_6$ | $E_1$ $E_2$ $E_3$ $E_4$ Data for restoration 513 <br> $E_2$ $E_3$ $E_4$ $E_5$ Data for restoration 513 | $R_1$ $R_2$ $R_3$ $R_4$ $R_5$ <br> $R_1$ $R_3$ $R_4$ $R_5$ $R_6$ |
| Type EMRM-R 521 | $E_2$ $E_1$ $E_3$ $E_2$ $E_4$ $E_3$ $E_5$ $E_4$ | Missing data 522 <br> $R_1$ $R_3$ $R_4$ $R_5$ <br> $R_1$ $R_3$ $R_4$ $R_5$ $R_6$ | $E_1$ $E_2$ $E_3$ $E_4$ <br> $E_2$ $E_3$ $E_4$ $E_5$ | $R_1$ $R_2$ $R_3$ $R_4$ $R_5$ Data for restoration 523 <br> $R_1$ $R_3$ $R_4$ $R_5$ $R_6$ |
| Type EMRM-A 531 | $E_2$ $E_1$ $E_3$ $E_2$ $E_4$ $E_5$ $E_4$ ← Missing data 1 532 | Missing data 2 533 <br> $R_1$ $R_3$ $R_4$ $R_5$ <br> $R_1$ $R_3$ $R_4$ $R_5$ $R_6$ | $E_1$ $E_2$ $E_3$ $E_4$ Data for restoration of missing data 1 534 <br> $E_2$ $E_3$ $E_4$ $E_5$ Data for restoration of missing data 1 534 | $R_1$ $R_2$ $R_3$ $R_4$ $R_5$ Data for restoration of missing data 2 535 <br> $R_1$ $R_3$ $R_4$ $R_5$ $R_6$ |

METHOD AND DEVICE FOR RESTORING MISSING OPERATIONAL DATA

CROSS-REFERENCE TO RELATED APPLICATION(S)

A claim for priority under 35 U.S.C. § 119 is made to Korean Patent Application No. 10-2018-0170893 filed on Dec. 27, 2018, in the Korean Intellectual Property Office, the entire contents of which are hereby incorporated by reference.

BACKGROUND

1. Field of the Invention

One or more example embodiments relate to a method and a device for restoring missing operational data that classify data characteristics into four levels and then divide the data characteristics into three depending on a missing type to perform the analysis corresponding to a total of 12 missing cases, for the purpose of restoring the deficiency in operational data different in features from numerical observation data.

2. Description of the Related Art

The conventional technology of processing missing data is mainly applied to numerical observation data restrictively; when deficiency occurs in operational data for operating an event log or the like, the conventional technology of processing missing data has restored the missing data by using statistical methods such as a mean substitution method, a stochastic substitution method, and the like.

When the technology of processing missing data is applied to the operational data, because the operational data and the observation data have different properties from each other, the restoration rate tends to be low (the level of about 40~50% compared with the observation data), and thus it is difficult to apply the technology of processing missing data to the practical use.

As such, there is an urgent need for a new technology that enables a high restoration rate and rapid restoration processing by applying the technology of processing missing data to the operational data such as event logs, or the like.

SUMMARY

Example embodiments provide a method and a device for restoring missing operational data that select candidate data required to restore missing data depending on a form in which a resource is defined by an event and a location where missing data is identified, in operational data including events and resources.

Furthermore, example embodiments restore the missing data by deriving the distribution of the entire data set based on data characteristics and substituting data, which occurs stochastically, multiple times.

Moreover, example embodiments determine a data range capable of being used for input, enter missing data, and perform the evaluation to enable accurate restoration of data.

According to an exemplary embodiment, a method for restoring missing operational data includes determining whether missing data is present in a first event defining operational data or a first resource constituting the operational data, extracting candidate data from a missing table, depending on a form in which the first resource is defined by the first event and a location where the missing data is identified, and processing the candidate data to restore the missing data, based on a predetermined restoration scheme.

According to an exemplary embodiment, a restoration device of missing operational data includes a check unit determining whether missing data is present in a first event defining operational data or a first resource constituting the operational data, an extraction unit extracting candidate data from a missing table, depending on a form in which the first resource is defined by the first event and a location where the missing data is identified, and a restoration unit processing the candidate data to restore the missing data, based on a predetermined restoration scheme.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 2 is a view for describing a restoration method used in the inventive concept in the case where a type of operational data is E1R1;

FIG. 3 is a view for describing a restoration method used in the inventive concept in the case where a type of operational data is EMR1;

FIG. 5 is a view for describing a restoration method used in the inventive concept in the case where a type of operational data is EMRM;

DETAILED DESCRIPTION

Figure 1:
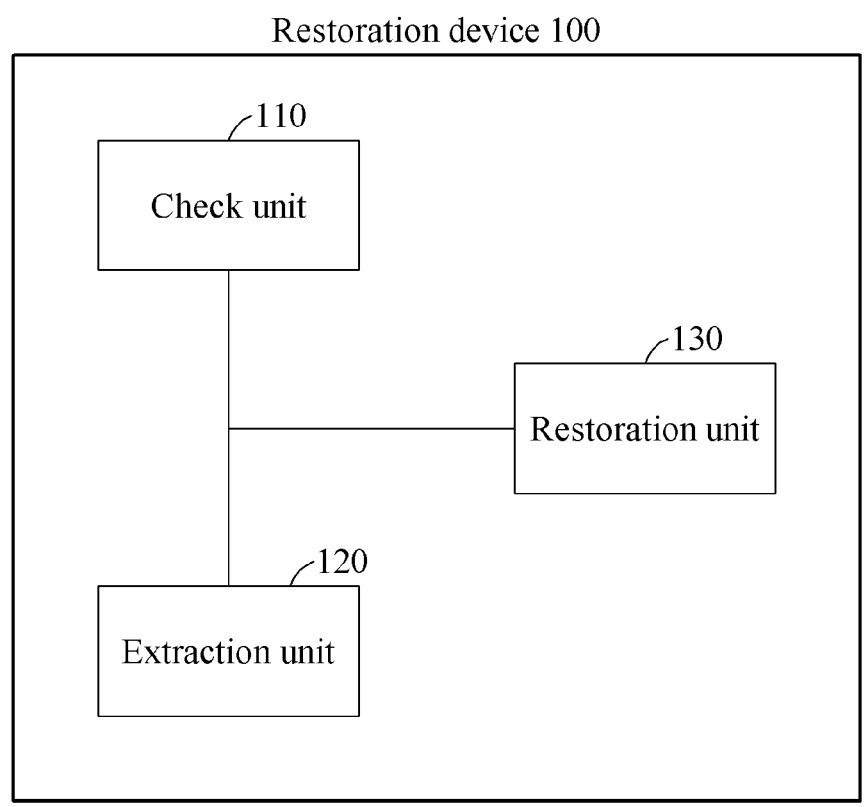
FIG. 1 is a block diagram illustrating a configuration of a restoration device of missing operational data, according to an example embodiment.

Hereinafter, embodiments will be described in detail with reference to accompanying drawings. Various changes may be made to the embodiments, but the scope of the inventive concept is neither limited nor restricted by the embodiments. It should be understood that all modifications, equivalents, and alternatives for the embodiments are included in the spirit and scope of the inventive concept.

The terminology used in the embodiment is for the purpose of description and should not be construed as limiting. The articles "a," "an," and "the" are singular in that they have a single referent, however, the use of the singular form in the present document should not preclude the presence of more than one referent. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which the embodiment belongs. It will be understood that terms used herein should be interpreted as having a meaning that is consistent with their meaning in the context of the inventive concept and the relevant art and will not be interpreted in an idealized or overly formal sense unless expressly so defined herein.

Furthermore, in the following description with reference to the accompanying drawings, the same reference numerals are assigned to the same components regardless of the reference numerals, and redundant descriptions thereof will be omitted. In the following description of the embodiment, when it is determined that the detailed description of the related well-known technology may obscure the gist of the embodiment unnecessarily, the detailed description thereof will be omitted.

FIG. 1 is a block diagram illustrating a configuration of a restoration device of missing operational data, according to an example embodiment.

Referring to FIG. 1, a restoration device 100 may be configured to include a check unit 110, an extraction unit 120, and a restoration unit 130.

First of all, the check unit 110 determines whether missing data is present in the first event defining operational data or in the first resource constituting the operational data. Herein, for example, the operational data may refer to data necessarily required to perform the function of an organization, such as an event log, as data that needs to be stored, maintained, and managed in a database.

The operational data may consist of an event in a header area for identifying and defining the operational data and a resource in a body area, which corresponds to the data itself and which constitutes the operational data.

The event may be to record the occurrence of the operation or work that affects the execution of a program or a task, or an input/output operation while the program is running; the event may be generated to include data link control commands, reactions, and the like between adjacent nodes, for exchanging identification information and other information between two nodes in data transmission.

Furthermore, in a computer operating system, the resource may refer to data or routines capable of being utilized by programs and may be referred to as one component of hardware, software, or data that constitutes the part of a larger system.

That is, the check unit 110 may determine the location of the missing data, in the event and the resource of the operational data. The missing data may be data in the case where the data is not identified 100 percent accurately, as the generic term of data in the case where specific data is missing or in the case where part/whole information is deleted.

Furthermore, the extraction unit 120 extracts candidate data from a missing table, depending on the form in which the first resource is defined by the first event and a location where the missing data is identified. That is, the extraction unit 120 may search for and extract the candidate data for restoration from the missing table, in consideration of the type of the operational data according to an aspect in which the event and the resource are matched with each other and whether the deficiency occurs in one or both of the event and the resource.

The type of the operational data may be distinguished while being displayed as an identifier. In the specification, the type of the operational data may be displayed as E1R1 in which a single resource is defined by a single event, EMR1 in which a single resource is defined by a plurality of events, E1RM in which a plurality of resources are defined by a single event, and EMRM, in which a plurality of resources are defined by a plurality of events.

Moreover, a notation for a location where the deficiency occurs may be added to the identifier; for example, "E" in the case where the deficiency occurs in an event, "R" in the case where the deficiency occurs in a resource, and "A" in the case where the deficiency occurs in both an event and a resource may be added to the identifier.

For example, when the first resource is defined by a single event and missing data is identified in the event, the identifier may be displayed as E1R1-E. Also, when a plurality of resources are defined by a plurality of events and the missing data is identified in both the event and the resource, the identifier may be displayed as EMRM-A.

Furthermore, the missing table may operate as the record storage for arranging and storing events and resources after the event and the resource correspond to each other, with respect to non-missing operational data that was previously entered and then was identified to be non-missing.

For example, the single resource without deficiency defined by the single event without deficiency may be matched and arranged in the missing table.

To sum up, the extraction unit 120 may search for an event or a resource as a candidate for restoring data of a specific portion in which the deficiency occurs, from the missing table and may extract the event or resource as the candidate data.

The restoration unit 130 processes the candidate data to restore the missing data, based on the predetermined restoration method. That is, the restoration unit 130 may compare the candidate data with the missing event or resource, and may select the optimal data for restoration to restore the missing data to the original state depending on the comparison result.

For example, the restoration method may include a method of comparing events or resources in the operational data and the non-missing operational data one-to-one and assigning scores depending on the degree of coincidence to determine candidate data to be restored, a method for determining candidate data to be restored through an event chain according to an order in which a unit event is arranged, a method for determining candidate data to be restored through a solution set composed of unit resources, or the like.

Hereinafter, the extraction of candidate data and the restoration of missing data will be described with reference to FIGS. 2 to 5.

FIG. 2 is a view for describing a restoration method used in the inventive concept in the case where a type of operational data is E1R1.

The operational data with deficiency is displayed in the left area of FIG. 2 while being divided into a first event 210 and a first resource 220; the non-missing operational data recorded in a missing table is displayed in the right area of FIG. 2 while a second event 230 is matched with a second resource 240.

As illustrated in FIG. 2, the operational data is of a type E1R1 where the single first resource 220 is defined by the single first event 210.

In the E1R1 type, when the missing data is identified in the first event 210, the operational data is displayed as the type E1R1-E 211.

First of all, as the operational data is of the type E1R1-E, the extraction unit 120 may search for non-missing operational data, which is organized to be the same as the first resource 220, from the missing table. That is, the extraction unit 120 may search for the second resource 240 of the non-missing operational data, which is the same as the first resource 220 of the operational data, from the missing table.

Also, the extraction unit 120 extracts the second event 230 defining the non-missing operational data, as the candidate data. That is, the extraction unit 120 may extract the second event 230, which corresponds to the second resource 240 and which defines the non-missing operational data, from the missing table.

To use FIG. 2 for an example, the extraction unit 120 may search for the second resource "R1 R2 R3 R4 R5" of the non-missing operational data, which is organized to be the same as the first resource "R1 R2 R3 R4 R5" of the operational data, from the missing table and may extract the second event "E1 E2 E3 E4" defining the found second resource "R1 R2 R3 R4 R5" as candidate data.

Afterwards, the restoration unit 130 may assign a score to each of a plurality of unit events in the second event 230, depending on the degree of coincidence with the first event 210. That is, the restoration unit 130 may compare the first event 210 and the second event 230 for each unit event, and may assign a score to the unit event in the second event 230, in the method of assigning "1" point in the case of coincidence or assigning "0" points in the case of discordance.

In FIG. 2, the restoration unit 130 may assign "0" points as the missing data in the first event does not coincide with a unit event "E3" 213 in the second event.

Afterward, the restoration unit 130 includes the unit event, to which the score of "0" is assigned due to discordance, in the first event 210 to restore the missing data. For example, in FIG. 2, the restoration unit 130 may fill missing data 212 in the first event 210 with the unit event "E3" 213 in the second event 230, to which the score of "0" is assigned, and may allow the first event 210 to be restored to the complete form.

In another embodiment, in the E1R1 type, when the missing data is identified in the first resource 220, the operational data is displayed as the type E1R1-R 221.

As the operational data is of the type E1R1-R, the extraction unit 120 may search for the non-missing operational data, which is defined by the second event 230 the same as the first event 210, from the missing table. That is, the extraction unit 120 may search for the second event 230 of the non-missing operational data the same as the first event 210 of the operational data, from the missing table.

Also, the extraction unit 120 extracts the second resource 240 constituting the non-missing operational data, as the candidate data. That is, the extraction unit 120 may extract the second resource 240, which corresponds to the second event 230 and which constitutes the non-missing operational data, from the missing table.

To use FIG. 2 for an example, the extraction unit 120 may search for the second event "E1 E2 E3 E4" of the non-missing operational data the same as the first event "E1 E2 E3 E4" of the operational data, from the missing table and may extract the second resource "R1 R2 R3 R4 R5" constituting the non-missing operational data defined by the found second event "E1 E2 E3 E4", as candidate data.

Afterwards, the restoration unit 130 may assign scores to a plurality of unit resources in the second resource 240, depending on the degree of the coincidence with the first resource 220. That is, the restoration unit 130 may compare the first resource 220 and the second resource 240 for each unit resource, and may assign a score to the unit resource in the second resource 240, in the method of assigning "1" point in the case of coincidence or assigning "0" points in the case of discordance.

In FIG. 2, the restoration unit 130 may assign "0" points as the missing data in the first resource does not coincide with a unit resource "R2" 223 in the second resource.

Afterward, the restoration unit 130 includes the unit resource, to which the score of "0" is assigned due to discordance, in the first resource 220 to restore the missing data. For example, in FIG. 2, the restoration unit 130 may fill missing data 222 in the first resource 220 with the unit resource "R2" 223 in the second resource 240, to which the score of "0" is assigned, and may allow the first resource 220 to be restored to the complete form.

In another embodiment, in the E1R1 type, when the missing data is identified in both the first event 210 and the first resource 220, the operational data is displayed as the type E1R1-A 231.

As the operational data is of the type E1R1-A, the extraction unit 120 may search for "n" pieces of non-missing operational data, which are organized to at least include the first resource 220, from the missing table. That is, the extraction unit 120 may search for the second resource 240 of each of pieces of non-missing operational data at least including a unit resource without deficiency in the first resource 220 of the operational data, from the missing table.

Also, the extraction unit 120 extracts the "n" second events 230 defining the "n" pieces of non-missing operational data, as the candidate data. That is, the extraction unit 120 may extract the plurality of second events 230, which correspond to the plurality of second resources 240 and which define the non-missing operational data, from the missing table.

To use FIG. 2 for an example, the extraction unit 120 may search for the second resources "R1 R2 R3 R4 R5" and "R1 R3 R4 R5 R6" of two pieces of non-missing operational data, which are organized to at least include "R1 R3 R4 R5" without the deficiency, in the first resource "R1 ○ R3 R4 R5" of the operational data from the missing table and may extract the second events "E1 E2 E3 E4" and "E2 E3 E4 E5", which respectively define the found second resources "R1 R2 R3 R4 R5" and "R1 R3 R4 R5 R6", as the candidate data.

Afterwards, the restoration unit 130 may assign a score to each of a plurality of unit events in the "n" second events 230, depending on the degree of coincidence with the first event 210. That is, the restoration unit 130 may compare the first event 210 and the plurality of second events 230 for each unit event, and may assign a score to the unit event in the second events 230, in the method of assigning "1" point in the case of coincidence or assigning "0" points in the case of discordance.

In FIG. 2, the restoration unit 130 may assign "0" points as the missing data in the first event does not coincide with a unit event "E3" 234 in the second event.

Afterward, the restoration unit 130 includes the unit event, to which the score of "0" is assigned in all the "n" second events, in the first event 210 to restore the missing data for the first event 210. For example, in FIG. 2, the restoration unit 130 may fill missing data 1 232 in the first event 210 with the respective unit event "E3" 234 in the second event 230, to which the score of "0" is assigned in common, and may allow the first event 210 to be restored to the complete form.

Furthermore, the extraction unit 120 may search for the non-missing operational data defined by the second event 230 the same as the restored first event 210 and may extract the second resource 240 constituting the found non-missing operational data from the missing table as the candidate data.

To use FIG. 2 for an example, the extraction unit 120 may search for the second event "E1 E2 E3 E4" of the non-missing operational data the same as the restored first event "E1 E2 E3 E4" of the operational data, from the missing table and may extract the second resource "R1 R2 R3 R4 R5" constituting the non-missing operational data defined by the found second event "E1 E2 E3 E4", as candidate data.

Afterward, the restoration unit 130 assigns a score to each of a plurality of unit resources in the second resource 240 depending on the degree of coincidence with the first resource 220 and restores the missing data by including a unit resource, to which the score of "0" is assigned due to discordance, in the first resource 220. For example, in FIG. 2, the restoration unit 130 may fill missing data 2 233 in the first resource 220 with a unit resource "R2" 235 in the second resource 240, to which the score of "0" is assigned, and may allow the first resource 220 to be restored to the complete form.

FIG. 3 is a view for describing a restoration method used in the inventive concept in the case where a type of operational data is EMR1.

As illustrated in FIG. 3, the operational data is of a type EMR1 where a single first resource 320 is defined by a plurality of first events 310.

In the EMR1 type, when the missing data is identified in the plurality of first events 310, the operational data is displayed as a type EMR1-E 311.

First of all, as the operational data is of the type EMR1-E, the extraction unit 120 may search for non-missing operational data, which is organized to be the same as the first resource 320, from the missing table. That is, the extraction unit 120 may search for a second resource 340 of the non-missing operational data, which is the same as the first resource 320 of the operational data, from the missing table.

Also, the extraction unit 120 extracts a second event 330 defining the non-missing operational data, as the candidate data. That is, the extraction unit 120 may extract the second event 330, which corresponds to the second resource 340 and which defines the non-missing operational data, from the missing table.

To use FIG. 3 for an example, the extraction unit 120 may search for the second resource "R1 R2 R3 R4 R5" of the non-missing operational data, which is organized to be the same as the first resource "R1 R2 R3 R4 R5" of the operational data, from the missing table and may extract the second event "E1 E2 E3 E4" defining the found second resource "R1 R2 R3 R4 R5" as candidate data.

Afterward, the restoration unit 130 may identify an event chain associated with the order in which a plurality of unit events in the second event 330 are arranged. That is, the restoration unit 130 may identify a structure in which unit events are arranged in the second event 330, as the event chain.

In FIG. 3, the restoration unit 130 may identify the event chain organized as "E1-E2-E3-E4", depending on an order in which unit events in the second event "E1 E2 E3 E4" are arranged.

Afterward, the restoration unit 130 restores the missing data by arranging unit events in the first event 310 depending on the identified event chain. For example, in FIG. 3, the restoration unit 130 may fill missing data 312 in the plurality of first events 310 with "E2" 313 to arrange "E2 E3 E4 E5" and "E1 E2 E3 E4", depending on the identified event chain E1-E2-E3-E4 and thus may allow each of the plurality of first events 310 to be restored to the complete form.

In another embodiment, in the EMR1 type, when the missing data is identified in the first resource 320, the operational data is displayed as a type EMR1-R 321.

As the operational data is of the type EMR1-R, the extraction unit 120 may search for the non-missing operational data, which is defined by the second event 330 the same as at least one of the plurality of first events 310, from the missing table. That is, the extraction unit 120 may search for the second event 330 of the non-missing operational data, which is the same as the first event 310 of the operational data, from the missing table.

Also, the extraction unit 120 extracts the second resource 340 constituting the non-missing operational data, as the candidate data. That is, the extraction unit 120 may extract the second resource 340, which corresponds to the second event 330 and which constitutes the non-missing operational data, from the missing table.

To use FIG. 3 for an example, the extraction unit 120 may search for the second event "E1 E2 E3 E4" of the non-missing operational data the same as "E1 E2 E3 E4" among the plurality of first events "E2 E3 E4 E5" and "E1 E2 E3 E4" of the operational data, from the missing table and may extract the second resource "R1 R2 R3 R4 R5" constituting the non-missing operational data defined by the found second event "E1 E2 E3 E4", as candidate data.

Afterward, the restoration unit 130 may determine the solution set composed of a plurality of unit resources in the second resource 340. That is, the restoration unit 130 may bundle respective unit resources included in the second resource 340 into a group to determine a solution set.

In FIG. 3, the restoration unit 130 may determine the solution set {"R1", "R2", "R3", "R4", and "R5"}, which is extracted as candidate data and which is composed of unit resources in the second resource.

Also, the restoration unit 130 searches for the missing unit resource among unit resources in the determined solution set and fills the first resource to restore the missing data. For example, in FIG. 3, the restoration unit 130 may fill missing data 322 in the first resource 320 with the "R2" 323, which is not common to the unit resource in the first resource 320 among the solution set {"R1", "R2", "R3", "R4", "R5"} except that it is common to the unit resource in the first resource 320, and may allow the first resource 320 to be restored to the complete form.

In another embodiment, in the EMR1 type, when the missing data is identified in both the plurality of first events 310 and the first resource 320, the operational data is displayed as a type EMR1-A 331.

As the operational data is of the type EMR1-A, the extraction unit 120 may search for "n" pieces of non-missing operational data, which are organized to at least include the first resource 320, from the missing table. That is, the extraction unit 120 may search for the second resource 340 of each of pieces of non-missing operational data at least including a unit resource without deficiency in the first resource 320 of the operational data, from the missing table.

Also, the extraction unit 120 extracts the "n" second events 330 defining the "n" pieces of non-missing operational data, as the candidate data. That is, the extraction unit 120 may extract the plurality of second events 330, which correspond to the plurality of second resources 340 and which define the non-missing operational data, from the missing table.

To use FIG. 3 for an example, the extraction unit 120 may search for the second resources "R1 R2 R3 R4 R5" and "R1 R3 R4 R5 R6" of two pieces of non-missing operational data, which are organized to at least include "R1 R3 R4 R5" without the deficiency, in the first resource "R1 ○ R3 R4 R5" of the operational data from the missing table and may extract the second events "E1 E2 E3 E4" and "E2 E3 E4 E5", which respectively define the found second resources "R1 R2 R3 R4 R5" and "R1 R3 R4 R5 R6, as the candidate data.

Afterward, the restoration unit 130 may identify "n" event chains associated with the order in which a plurality of unit events in the "n" second events 330 are arranged. In FIG. 3, the restoration unit 130 may identify the event chain organized as "E1-E2-E3-E4", depending on an order in which unit events in the second event "E1 E2 E3 E4" are arranged; furthermore, the restoration unit 130 may identify the event chain organized as "E2-E3-E4-E5", depending on an order in which unit events in the second event "E2-E3-E4-E5" are arranged.

Furthermore, the restoration unit 130 may connect the "n" event chains to build the combination event chain. In FIG. 3, the restoration unit 130 may connect the identified E1-E2-E3-E4 and E2-E3-E4-E5 based on the common E2-E3-E4 to build the combination event chain E1-E2-E3-E4-E5.

Afterward, the restoration unit 130 restores the missing data for the first event by arranging unit events in the first event 310 depending on the built combination event chain. In FIG. 3, the restoration unit 130 may fill the missing data 1 332 in the plurality of first events 310 with "E2" 334 depending on the built combination event chain E1-E2-E3-E4-E5 to arrange "E2 E3 E4 E5" and "E1 E2 E3 E4", and thus may allow each of the plurality of first events 310 to be restored to the complete form.

Furthermore, the extraction unit 120 may search for the non-missing operational data defined by the second event 330 the same as at least one of the restored first events 310 and may extract the second resource 340 constituting the found non-missing operational data from the missing table as the candidate data.

To use FIG. 3 for an example, the extraction unit 120 may search for "E1 E2 E3 E4" the same as the second event "E1 E2 E3 E4" of the non-missing operational data among the restored first events "E2 E3 E4 E5" and "E1 E2 E3 E4" of the operational data, from the missing table and may extract the second resource "R1 R2 R3 R4 R5" constituting the non-missing operational data defined by the found second event "E1 E2 E3 E4", as candidate data.

Afterward, the restoration unit 130 may determine the solution set composed of a plurality of unit resources in the second resource 340. In FIG. 3, the restoration unit 130 may determine the solution set {"R1", "R2", "R3", "R4", and "R5"}, which is extracted as candidate data and which is composed of unit resources in the second resource.

Also, the restoration unit 130 may search for the missing unit resource among unit resources in the determined solution set and may fill the first resource to restore the missing data for the first resource. For example, in FIG. 3, the restoration unit 130 may fill missing data 2 333 in the first resource 320 with "R2" 335, which is not common to the unit resource in the first resource 320 among the solution set {"R1", "R2", "R3", "R4", "R5"} except that it is common to the unit resource in the first resource 320, and may allow the first resource 220 to be restored to the complete form.

Figure 4:
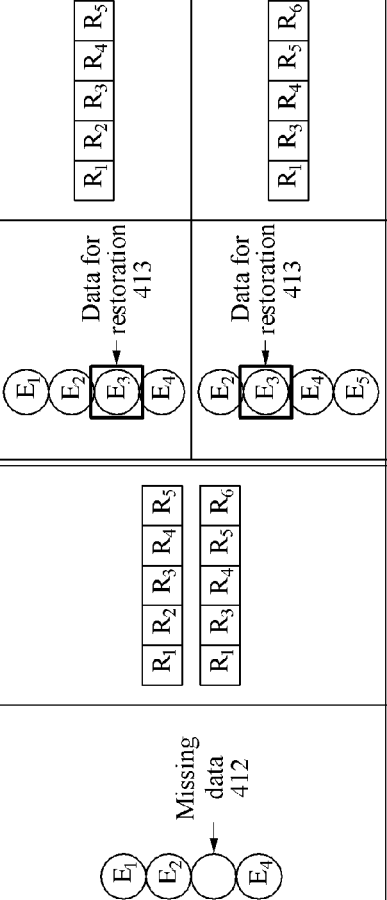
FIG. 4 is a view for describing a restoration method used in the inventive concept in the case where a type of operational data is E1RM.

FIG. 4 is a view for describing a restoration method used in the inventive concept in the case where a type of operational data is E1RM.

As illustrated in FIG. 4, the operational data is of a type E1RM where a plurality of first resources 420 are defined by a single first event 410.

In the E1RM type, when the missing data is identified in the single first event 410, the operational data is displayed as a type E1RM-E 411.

First of all, as the operational data is of the type E1RM-E, the extraction unit 120 may search for "n" pieces of non-missing operational data, which are organized to be the same as the plurality of first resources 420, from the missing table.

That is, the extraction unit 120 may search for a plurality of second resources 440 of the non-missing operational data, which are respectively the same as the plurality of first resources 420 of the operational data, from the missing table.

Also, the extraction unit 120 extracts "n" second events 430 defining the "n" pieces of non-missing operational data, as the candidate data. That is, the extraction unit 120 may extract the plurality of second events 430, which respectively correspond to the plurality of second resources 440 and which define the non-missing operational data, from the missing table.

To use FIG. 4 for an example, the extraction unit 120 may search for the two second resources "R1 R2 R3 R4 R5" and "R1 R3 R4 R5 R6" of the non-missing operational data, which are organized to be the same as the two first resources "R1 R2 R3 R4 R5" and "R1 R3 R4 R5 R6" of the operational data, from the missing table and may extract the two second events "E1 E2 E3 E4" and "E2 E3 E4 E5", which respectively define the two found second resources "R1 R2 R3 R4 R5" and "R1 R3 R4 R5 R6", as candidate data.

Afterward, the restoration unit 130 may identify "n" event chains associated with the order in which a plurality of unit events in the second event are arranged, with respect to each of the "n" second events 430. In FIG. 4, the restoration unit 130 may identify the event chain organized as "E1-E2-E3-E4", depending on an order in which unit events in the second event "E1 E2 E3 E4" are arranged; furthermore, the restoration unit 130 may identify the event chain organized as "E2-E3-E4-E5", depending on an order in which unit events in the second event "E2-E3-E4-E5" are arranged.

Furthermore, the restoration unit 130 may connect the "n" event chains to build the combination event chain. In FIG. 4, the restoration unit 130 may connect the identified E1-E2-E3-E4 and E2-E3-E4-E5 based on the common E2-E3-E4 to build the combination event chain E1-E2-E3-E4-E5.

Afterward, the restoration unit 130 restores the missing data for the first event by arranging unit events in the first event 310 depending on the built combination event chain. In FIG. 4, the restoration unit 130 may fill missing data 1 412 in the first event 410 with "E2" 413 depending on the built combination event chain E1-E2-E3-E4-E5 to arrange "E1 E2 E3 E4", and thus may allow the first event 410 to be restored to the complete form.

In another embodiment, in the E1RM type, when the missing data is identified in the plurality of first resources 420, the operational data is displayed as a type E1RM-R 421.

As the operational data is of the type E1RM-R, the extraction unit 120 may search for the non-missing operational data, which is defined by the second event 430 the same as the first event 410, from the missing table. Also, the extraction unit 120 extracts the second resource 440 constituting the non-missing operational data, as the candidate data.

To use FIG. 4 for an example, the extraction unit 120 may search for the second event "E1 E2 E3 E4" of the non-missing operational data the same as the first event "E1 E2 E3 E4" of the operational data, from the missing table and may extract the second resource "R1 R2 R3 R4 R5" constituting the non-missing operational data defined by the found second event "E1 E2 E3 E4", as candidate data.

Afterward, the restoration unit 130 may determine the solution set composed of a plurality of unit resources in the second resource 440. In FIG. 4, the restoration unit 130 may determine the solution set {"R1", "R2", "R3", "R4", and "R5"}, which is extracted as candidate data and which is composed of unit resources in the second resource.

Also, the restoration unit 130 searches for the missing unit resource among unit resources in the determined solution set and fills the first resource to restore the missing data. For example, in FIG. 4, the restoration unit 130 may fill missing data 422 in the first resource 420 with "R2" 423, which is not common to the unit resource in the first resource 420 among the solution set {"R1", "R2", "R3", "R4", "R5"} except that it is common to the unit resource in the first resource 420, and may allow the first resource 420 to be restored to the complete form.

In another embodiment, in the E1RM type, when the missing data is identified in both the single first event 410 and the plurality of first resources 420, the operational data is displayed as a type E1RM-A 431.

As the operational data is of the type E1RM-A, the extraction unit 120 may search for "n" pieces of non-missing operational data, which are organized to be at least the same as the plurality of first resources 410, from the missing table. That is, the extraction unit 120 may search for the second resource 440 of each of pieces of non-missing operational data at least including a unit resource without deficiency in the plurality of first resources 420 of the operational data, from the missing table.

Also, the extraction unit 120 extracts the "n" second events 430 defining the "n" pieces of non-missing operational data, as the candidate data. That is, the extraction unit 120 may extract the plurality of second events 430, which correspond to the plurality of second resources 440 and which define the non-missing operational data, from the missing table.

To use FIG. 4 for an example, the extraction unit 120 may search for the second resources "R1 R2 R3 R4 R5" and "R1 R3 R4 R5 R6" of two pieces of non-missing operational data, which are organized to at least identically include "R1 R3 R4 R5" without the deficiency, in the two first resources "R1 ○ R3 R4 R5" and "R1 R3 R4 R5 R6" of the operational data from the missing table and may extract the second events "E1 E2 E3 E4" and "E2 E3 E4 E5", which respectively define the found second resources "R1 R2 R3 R4 R5" and "R1 R3 R4 R5 R6, as the candidate data.

Afterward, the restoration unit 130 may identify "n" event chains associated with the order in which a plurality of unit events in the "n" second events 430 are arranged. In FIG. 4, the restoration unit 130 may identify the event chain organized as "E1-E2-E3-E4", depending on an order in which unit events in the second event "E1 E2 E3 E4" are arranged; furthermore, the restoration unit 130 may identify the event chain organized as "E2-E3-E4-E5", depending on an order in which unit events in the second event "E2-E3-E4-E5" are arranged.

Furthermore, the restoration unit 130 may connect the "n" event chains to build the combination event chain. In FIG. 4, the restoration unit 130 may connect the identified E1-E2-E3-E4 and E2-E3-E4-E5 based on the common E2-E3-E4 to build the combination event chain E1-E2-E3-E4-E5.

Afterward, the restoration unit 130 restores the missing data for the first event by arranging unit events in the first event 310 depending on the built combination event chain. In FIG. 4, the restoration unit 130 may fill missing data 1 432 in the first event 410 with "E2" 434 depending on the built combination event chain E1-E2-E3-E4-E5 to arrange "E1 E2 E3 E4", and thus may allow the first event 410 to be restored to the complete form.

Furthermore, the extraction unit 120 may search for the non-missing operational data defined by the second event 430 the same as the restored first event 410 and may extract the second resource 440 constituting the found non-missing operational data from the missing table as the candidate data.

To use FIG. 4 for an example, the extraction unit 120 may search for the second event "E1 E2 E3 E4" of the non-missing operational data the same as the restored first event "E1 E2 E3 E4" of the operational data, from the missing table and may extract the second resource "R1 R2 R3 R4 R5" constituting the non-missing operational data defined by the found second event "E1 E2 E3 E4", as candidate data.

Afterward, the restoration unit 130 may determine the solution set composed of a plurality of unit resources in the second resource 440. In FIG. 4, the restoration unit 130 may determine the solution set {"R1", "R2", "R3", "R4", and "R5"}, which is extracted as candidate data and which is composed of unit resources in the second resource.

Also, the restoration unit 130 may search for the missing unit resource among unit resources in the determined solution set and may fill the first resource to restore the missing data for the first resource. For example, in FIG. 4, the restoration unit 130 may fill missing data 2 433 in the first resource 420 with "R2" 435, which is not common to the unit resource in the first resource 420 among the solution set {"R1", "R2", "R3", "R4", "R5"} except that it is common to the unit resource in the first resource 420, and may allow the first resource 420 to be restored to the complete form.

FIG. 5 is a view for describing a restoration method used in the inventive concept in the case where a type of operational data is EMRM.

As illustrated in FIG. 5, the operational data is of a type EMRM where a plurality of first resources 520 are defined by a plurality of first events 510.

In the EMRM type, when the missing data is identified in the plurality of first events 510, the operational data is displayed as a type EMRM-E 511.

First of all, as the operational data is of the type EMRM-E, the extraction unit 120 may search for "n" pieces of non-missing operational data, which are organized to be the same as the plurality of first resources 520, from the missing table. That is, the extraction unit 120 may search for a plurality of second resources 540 of the non-missing operational data, which are respectively the same as the plurality of first resources 520 of the operational data, from the missing table.

Also, the extraction unit 120 extracts the "n" second events 530 defining the "n" pieces of non-missing operational data, as the candidate data. That is, the extraction unit 120 may extract the plurality of second events 530, which respectively correspond to the plurality of second resources 540 and which define the non-missing operational data, from the missing table.

To use FIG. 5 for an example, the extraction unit 120 may search for the two second resources "R1 R2 R3 R4 R5" and "R1 R3 R4 R5 R6" of the non-missing operational data, which are organized to be the same as the two first resources "R1 R2 R3 R4 R5" and "R1 R3 R4 R5 R6" of the operational data, from the missing table and may extract the two second events "E1 E2 E3 E4" and "E2 E3 E4 E5", which respectively define the two found second resources "R1 R2 R3 R4 R5" and "R1 R3 R4 R5 R6, as candidate data.

Afterward, the restoration unit 130 may identify "n" event chains associated with the order in which a plurality of unit events in the second event are arranged, with respect to each of the "n" second events 530. In FIG. 5, the restoration unit 130 may identify the event chain organized as "E1-E2-E3-E4", depending on an order in which unit events in the second event "E1 E2 E3 E4" are arranged; furthermore, the restoration unit 130 may identify the event chain organized as "E2-E3-E4-E5", depending on an order in which unit events in the second event "E2-E3-E4-E5" are arranged.

Furthermore, the restoration unit 130 may connect the "n" event chains to build the combination event chain. In FIG. 5, the restoration unit 130 may connect the identified E1-E2-E3-E4 and E2-E3-E4-E5 based on the common E2-E3-E4 to build the combination event chain E1-E2-E3-E4-E5.

Afterward, the restoration unit 130 restores the missing data for the first event by arranging unit events in the first event 310 depending on the built combination event chain. In FIG. 5, the restoration unit 130 may fill missing data 1 512 in the plurality of first events 510 with "E2" 513 depending on the built combination event chain E1-E2-E3-E4-E5 to arrange "E2 E3 E4 E5" and "E1 E2 E3 E4", and thus may allow the plurality of first events 510 to be restored to the complete forms.

In another embodiment, in the EMRM type, when the missing data is identified in the plurality of first resources 520, the operational data is displayed as a type EMRM-R 521.

As the operational data is of the type EMRM-R, the extraction unit 120 may search for the "n" pieces of non-missing operational data, which are defined by the "n" second events 530 the same as the plurality of first events 510, from the missing table. That is, the extraction unit 120 may search for the second event 530 of the plurality of non-missing operational data, each of which is the same as the first event 510 of the operational data, from the missing table.

Also, the extraction unit 120 extracts the "n" second resources 540 constituting the "n" pieces of non-missing operational data, as the candidate data. That is, the extraction unit 120 may extract the plurality of second resources 540, each of which corresponds to the second event 530 and each of which constitutes the non-missing operational data, from the missing table.

To use FIG. 5 for an example, the extraction unit 120 may search for the second event "E2 E3 E4 E5" of the non-missing operational data the same as the first event "E2 E3 E4 E5" of the operational data, from the missing table and may extract the second resource "R1 R3 R4 R5 R6" constituting the non-missing operational data defined by the found second event "E2 E3 E4 E5", as candidate data. Moreover, the extraction unit 120 may search for the second event "E1 E2 E3 E4" of the non-missing operational data the same as the other first event "E1 E2 E3 E4" of the operational data, from the missing table and may extract the second resource "R1 R2 R3 R4 R5" constituting the non-missing operational data defined by the found second event "E1 E2 E3 E4", as candidate data.

Afterward, the restoration unit 130 may determine the solution set composed of a plurality of unit resources in the "n" second resources 540. That is, the restoration unit 130 may bundle respective unit resources included in the second resource 540 into a group to determine a solution set.

In FIG. 5, the restoration unit 130 may determine the solution sets {"R1", "R3", "R4", "R5", "R6"} and {"R1", "R2", "R3", "R4", "R5"}, each of which is extracted as candidate data and each of which is composed of unit resources in the second resource.

Also, the restoration unit 130 searches for the missing unit resource among unit resources in the determined solution set and fills the first resource to restore the missing data. For example, in FIG. 5, the restoration unit 130 may fill missing data 522 in the first resource 520 with "R2" 523, which is not common to the unit resource in the first resource 520 among the solution set {"R1", "R2", "R3", "R4", "R5"} except that it is common to the unit resource in the first resource 520, and may allow the first resource 520 to be restored to the complete form. At this time, as another solution set {"R1", "R3", "R4", "R5", "R6"} is common to all unit resources "R1", "R3", "R4", "R5", "R6" in the first resource 520, another solution set {"R1", "R3", "R4", "R5", "R6"} does not participate in a restoration operation.

In another embodiment, in the EMRM type, when the missing data is identified in both the plurality of first events 520 and the plurality of first resources 520, the operational data is displayed as a type EMR1-A 531.

As the operational data is of the type EMRM-A, the extraction unit 120 may search for "n" pieces of non-missing operational data, which are organized to at least include the plurality of first resources 520, from the missing table. That is, the extraction unit 120 may search for the second resource 540 of each of pieces of non-missing operational data at least including a unit resource without deficiency in the first resource 520 of the operational data, from the missing table.

Also, the extraction unit 120 extracts the "n" second events 530 defining the "n" pieces of non-missing operational data, as the candidate data. That is, the extraction unit 120 may extract the plurality of second events 530, which correspond to the plurality of second resources 540 and which define the non-missing operational data, from the missing table.

To use FIG. 5 for an example, the extraction unit 120 may search for the second resources "R1 R2 R3 R4 R5" and "R1 R3 R4 R5 R6" of two pieces of non-missing operational data, which are organized to at least include "R1 R3 R4 R5", which do not have the deficiency and are common in the first resource "R1 ○ R3 R4 R5" and "R1 R3 R4 R5 R6" of the operational data from the missing table and may extract the second events "E1 E2 E3 E4" and "E2 E3 E4 E5", which respectively define the found second resources "R1 R2 R3 R4 R5" and "R1 R3 R4 R5 R6, as the candidate data.

Afterward, the restoration unit 130 may identify "n" event chains associated with the order in which a plurality of unit events in the "n" second events 530 are arranged. In FIG. 5, the restoration unit 130 may identify the event chain organized as "E1-E2-E3-E4", depending on an order in which unit events in the second event "E1 E2 E3 E4" are arranged; furthermore, the restoration unit 130 may identify the event chain organized as "E2-E3-E4-E5", depending on an order in which unit events in the second event "E2-E3-E4-E5" are arranged.

Furthermore, the restoration unit 130 may connect the "n" event chains to build the combination event chain. In FIG. 5, the restoration unit 130 may connect the identified E1-E2-E3-E4 and E2-E3-E4-E5 based on the common E2-E3-E4 to build the combination event chain E1-E2-E3-E4-E5.

Afterward, the restoration unit 130 restores the missing data for the first event by arranging unit events in the first event 310 depending on the built combination event chain. In FIG. 5, the restoration unit 130 may fill missing data 532 in the plurality of first events 510 with "E2" 534 depending on the built combination event chain E1-E2-E3-E4-E5 to arrange "E2 E3 E4 E5" and "E1 E2 E3 E4", and thus may allow each of the plurality of first events 510 to be restored to the complete form.

Furthermore, the extraction unit 120 may search for the non-missing operational data defined by the second event 530 the same as at least one of the restored first events 510 and may extract the second resource 540 constituting the found non-missing operational data from the missing table as the candidate data.

To use FIG. 5 for an example, the extraction unit 120 may search for "E1 E2 E3 E4" the same as the second event of the non-missing operational data among the restored first events "E2 E3 E4 E5" and "E1 E2 E3 E4" of the operational data, from the missing table and may extract the second resource "R1 R2 R3 R4 R5" constituting the non-missing operational data defined by the found second event "E1 E2 E3 E4", as candidate data.

Afterward, the restoration unit 130 may determine the solution set composed of a plurality of unit resources in the second resource 540. In FIG. 5, the restoration unit 130 may determine the solution set {"R1", "R2", "R3", "R4", and "R5"}, which is extracted as candidate data and which is composed of unit resources in the second resource.

Also, the restoration unit 130 may search for the missing unit resource among unit resources in the determined solution set and may fill the first resource to restore the missing data for the first resource. For example, in FIG. 5, the restoration unit 130 may fill missing data 2 533 in the first resource 520 with "R2" 535, which is not common to the unit resource in the first resource 520 among the solution set {"R1", "R2", "R3", "R4", "R5"} except that it is common to the unit resource in the first resource 520, and may allow the first resource 520 to be restored to the complete form.

According to an example embodiment, in operational data including events and resources, it is possible to provide a method and a device for restoring missing operational data that select candidate data required to restore missing data depending on a form in which a resource is defined by an event and a location where missing data is identified.

Furthermore, according to an example embodiment, it is possible to restore the missing data by deriving the distribution of the entire data set based on data characteristics and substituting data, which occurs stochastically, multiple times.

Moreover, it is possible to determine a data range capable of being used for input, enter missing data, and perform evaluation to enable the accurate restoration of data.

Figure 6A:
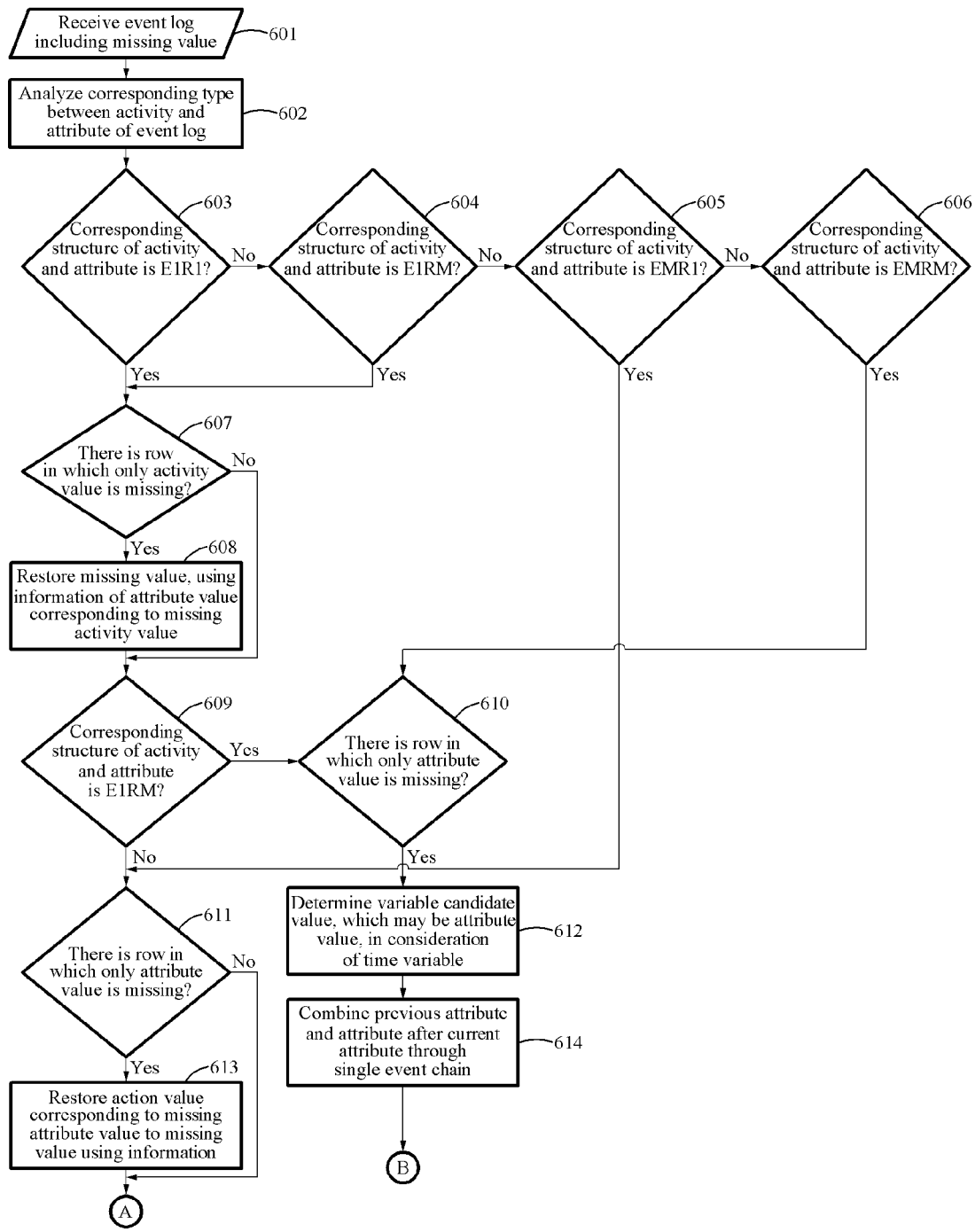
FIGS. 6A and 6B are diagrams for schematically describing an entire flow of restoring missing operational data, according to an example embodiment.
Figure 6B:
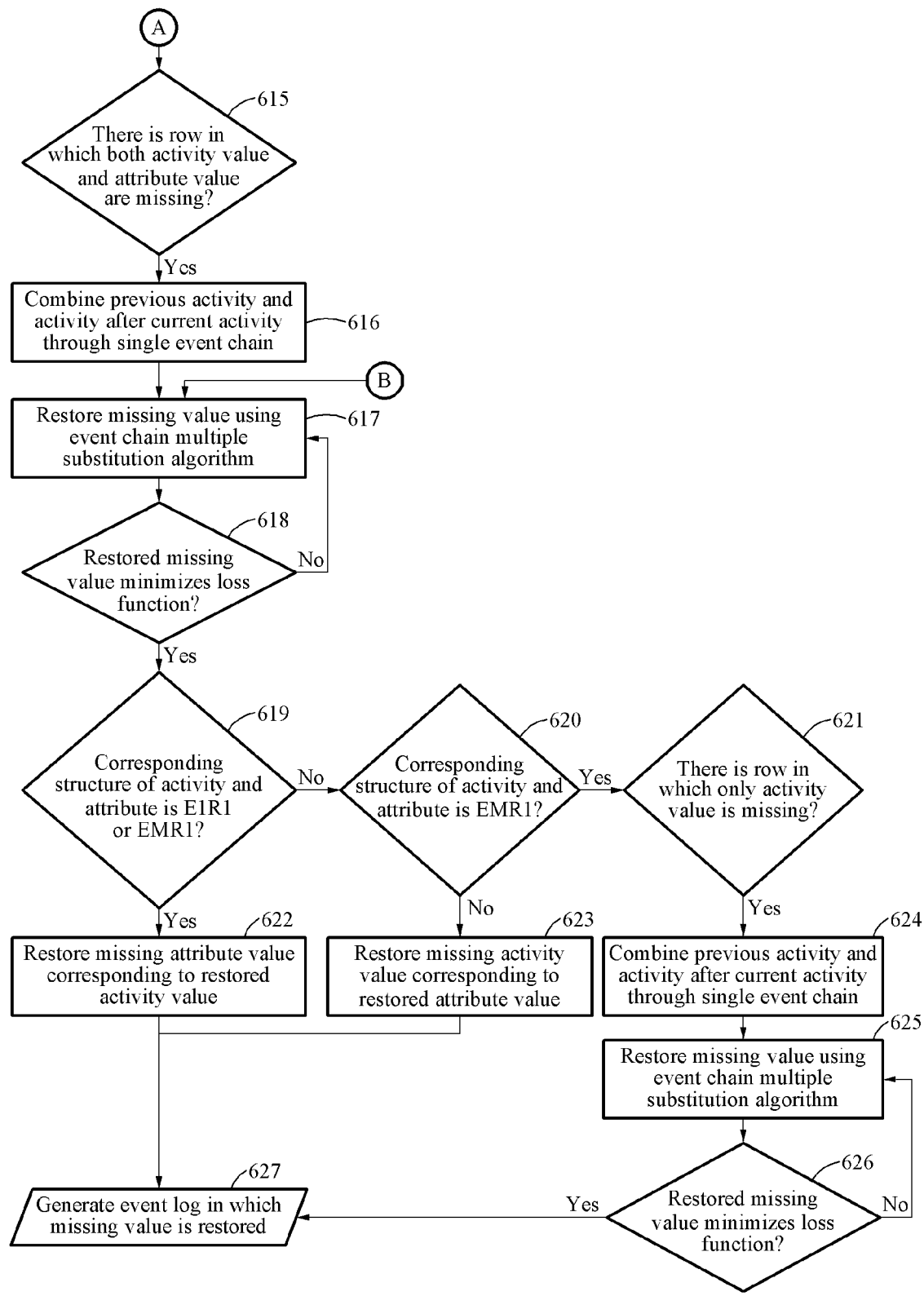

FIGS. 6A and 6B are diagrams for schematically describing an entire flow of restoring missing operational data, according to an example embodiment.

Referring to FIGS. 6A and 6B together, first of all, in operation 601, the restoration device 100 may receive an event log including a missing value.

Furthermore, in operation 602, the restoration device 100 may analyze the corresponding type between an activity (event) and an attribute (resource) for the event log.

Moreover, in operation 603, the restoration device 100 may determine whether the corresponding structure of the activity (event) and the attribute (resource) is E1R1.

When the determination result in operation 603 indicates that the corresponding structure is not E1R1 (No direction in operation 603), in operation 604, the restoration device 100 may determine whether the corresponding structure of the activity (event) and the attribute (resource) is E1RM.

When the determination result in operation 604 indicates that the corresponding structure is not E1RM (No direction in operation 604), in operation 605, the restoration device 100 may determine whether the corresponding structure of the activity (event) and the attribute (resource) is EMR1.

When the determination result in operation 605 indicates that the corresponding structure is not EMR1 (No direction in operation 605), in operation 606, the restoration device 100 may determine whether the corresponding structure of the activity (event) and the attribute (resource) is EMRM.

When the determination result in operation 603 indicates that the corresponding structure is E1R1 (Yes direction in operation 603) or when the determination result in operation 604 indicates that the corresponding structure is E1RM (Yes direction in operation 604), in operation 607, the restoration device 100 may determine whether there is a row in which only the activity value is missing.

When the determination result in operation 607 indicates that the row is present (Yes direction in operation 607), in operation 608, the restoration device 100 may restore the missing value, using the information of the attribute value corresponding to the missing activity value.

After operation 608 or when the determination result in operation 607 indicates that the row is not present (No direction in operation 607), in operation 609, the restoration device 100 may determine whether the corresponding structure of the activity (event) and the attribute (resource) is E1RM.

When the determination result in operation 609 indicates that the corresponding structure is E1RM (Yes direction in operation 609) or when the determination result in operation 606 indicates that the corresponding structure is EMRM (Yes direction in operation 606), in operation 610, the restoration device 100 may determine whether there is a row in which only the attribute value is missing.

When the determination result in operation 609 indicates that the corresponding structure is not E1RM (No direction in operation 609) or when the determination result in operation 605 indicates that the corresponding structure is EMR1 (Yes direction in operation 605), in operation 611, the restoration device 100 may determine whether there is a row in which only the attribute value is missing.

When the determination result in operation 610 indicates that there is a row in which only the attribute value is missing (Yes direction in operation 610), in operation 612, the restoration device 100 may determine the variable candidate value, which may be an attribute value, in consideration of a time variable.

When the determination result in operation 611 indicates that there is a row in which only the attribute value is missing (Yes direction in operation 611), in operation 613, the restoration device 100 may restore an action value corresponding to the missing attribute value to the missing value using information.

After operation 612, in operation 614, the restoration device 100 may combine the previous attribute and an attribute after the current attribute through a single event chain.

After operation 613, in operation 615, the restoration device 100 may determine whether there is a row in which both the activity value and the attribute value are missing.

When the determination result in operation 615 indicates that the row in which the activity value and the attribute value are missing is present (Yes direction in operation 615), in operation 616, the restoration device 100 may combine the previous activity and an activity after the current activity through a single event chain.

After operation 616 or after operation 614, in operation 617, the restoration device 100 may restore the missing value using the event chain multiple substitution algorithm.

After operation 617, in operation 618, the restoration device 100 may determine whether the restored missing value minimizes the loss function.

When the determination result in operation 618 indicates that the restored missing value does not minimize the loss function (No direction in operation 618), the restoration device 100 may return to operation 617.

On the other hand, when the determination result in operation 618 indicates that the restored missing value minimizes the loss function (Yes direction in operation 618), in operation 619, the restoration device 100 may determine whether the corresponding structure of the activity and the attribute is E1R1 or EMR1.

When the determination result in operation 619 indicates that the corresponding structure is neither E1R1 nor EMR1 (No direction in operation 619), in operation 620, the restoration device 100 may determine whether the corresponding structure of the activity and the attribute is EMRM.

When the determination result in operation 620 indicates that the corresponding structure is not EMRM (No direction in operation 620), in operation 621, the restoration device 100 may determine whether there is a row in which only the activity value is missing.

When the determination result in operation 619 indicates that the corresponding structure is E1R1 or EMR1 (Yes direction in operation 619), in operation 622, the restoration device 100 may restore the missing attribute value corresponding to the restored activity value.

When the determination result in operation 620 indicates that the corresponding structure is EMRM (Yes direction in operation 620), in operation 623, the restoration device 100 may restore the missing activity value corresponding to the restored attribute value.

When the determination result in operation 621 indicates that the row in which only the activity value is missing is present (Yes direction in operation 621), in operation 624, the restoration device 100 may combine the previous activity and an activity after the current activity through a single event chain.

After operation 624, in operation 625, the restoration device 100 may restore the missing value using the event chain multiple substitution algorithm.

After operation 625, in operation 626, the restoration device 100 may determine whether the restored missing value minimizes the loss function.

When the determination result in operation 626 indicates that the restored missing value does not minimize the loss function (No direction in operation 626), the restoration device 100 may return to operation 625.

After operation 622, after operation 623, or when the determination result in operation 626 indicates that the restored missing value minimizes the loss function (Yes direction in operation 626), in operation 627, the restoration device 100 may generate an event log in which the missing value is restored.

Hereinafter, a task flow of the restoration device 100 according to example embodiments will be described with reference to FIG. 7.

Figure 7:
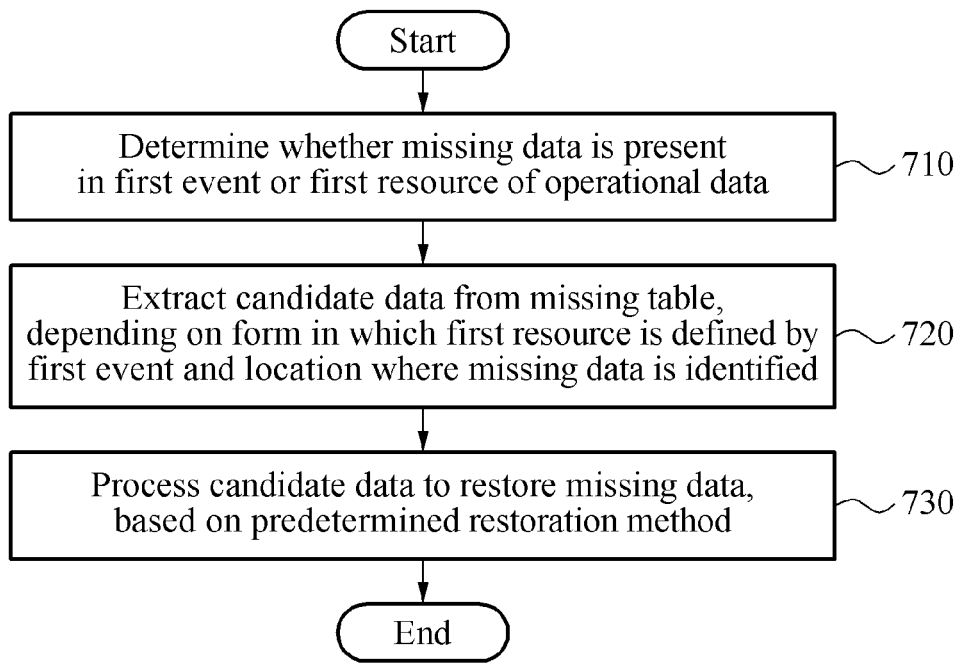
FIG. 7 is a flowchart illustrating an order of a restoration method, according to an example embodiment.

FIG. 7 is a flowchart illustrating an order of a restoration method, according to an example embodiment.

The restoration method according to an example embodiment may be performed by the above-described restoration device 100 of missing operational data.

First of all, in operation 710, the restoration device 100 determines whether missing data is present in the first event defining operational data or in the first resource constituting the operational data. Herein, for example, the operational data may refer to data necessarily required to perform the function of an organization, such as an event log, as data that needs to be stored, maintained, and managed in a database.

The operational data may consist of an event in a header area for identifying and defining the operational data and a resource in a body area, which corresponds to the data itself and which constitutes the operational data.

The event may be to record the occurrence of the operation or work that affects the execution of a program or a task, or an input/output operation while the program is running; the event may be generated to include data link control commands, reactions, and the like between adjacent nodes, for exchanging identification information and other information between two nodes in data transmission.

Furthermore, in a computer operating system, the resource may refer to data or routines capable of being utilized by programs and may be referred to as one component of hardware, software, or data that constitutes the part of a larger system.

That is, in operation 710 may be a process of determining the location of the missing data, in the event and the resource of the operational data. The missing data may be data in the case where the data is not identified 100 percent accurately, as the generic term of data in the case where specific data is missing or in the case where part/whole information is deleted.

Furthermore, in operation 720, the restoration device 100 extracts candidate data from a missing table, depending on the form in which the first resource is defined by the first event and a location where the missing data is identified. That is, operation 720 may be a process of searching for and extracting the candidate data for restoration from the missing table, in consideration of the type of the operational data according to an aspect in which the event and the resource are matched with each other and whether the deficiency occurs in one or both of the event and the resource.

The type of the operational data may be distinguished while being displayed as an identifier. The type of the operational data may be displayed as E1R1 in which a single resource is defined by a single event, EMR1 in which a single resource is defined by a plurality of events, E1RM in which a plurality of resources are defined by a single event, and EMRM, in which a plurality of resources are defined by a plurality of events.

Moreover, a notation for a location where the deficiency occurs may be added to the identifier; for example, "E" in the case where the deficiency occurs in an event, "R" in the case where the deficiency occurs in a resource, and "A" in the case where the deficiency occurs in both an event and a resource may be added to the identifier.

For example, when the first resource is defined by a single event and missing data is identified in the event, the identifier may be displayed as E1R1-E. Also, when a plurality of resources are defined by a plurality of events and the missing data is identified in both the event and the resource, the identifier may be displayed as EMRM-A.

Furthermore, the missing table may operate as the record storage for arranging and storing events and resources after the event and the resource correspond to each other, with respect to non-missing operational data that was previously entered and then was identified to be non-missing.

For example, the single resource without deficiency defined by the single event without deficiency may be matched and arranged in the missing table.

To sum up, the restoration device 100 in operation 720 may search for an event or a resource as a candidate for restoring data of a specific portion in which the deficiency occurs, from the missing table and may extract the event or resource as the candidate data.

Also, in operation 730, the restoration device 100 processes the candidate data to restore the missing data, based on the predetermined restoration method. Operation 730 may be a process of comparing the candidate data with the missing event or resource and then selecting the optimal data for restoration to restore the missing data to the original state depending on the comparison result.

For example, the restoration method may include a method of comparing events or resources in the operational data and the non-missing operational data one-to-one and assigning scores depending on the degree of coincidence to determine candidate data to be restored, a method for determining candidate data to be restored through an event chain according to an order in which a unit event is arranged, a method for determining candidate data to be restored through a solution set composed of unit resources, and the like.

First of all, under a method of comparing events or resources in the operational data and the non-missing operational data one-to-one and assigning scores depending on the degree of coincidence to determine candidate data to be restored, the operational data is of a type E1R1 where a single first resource is defined by a single first event.

In the E1R1 type, when the missing data is identified in the first event, the operational data is displayed as the type E1R1-E.

As the operational data is of the type E1R1-E, the restoration device 100 may search for non-missing operational data, which is organized to be the same as the first resource, from the missing table. That is, the restoration device 100 may search for the second resource of the non-missing operational data, which is the same as the first resource of the operational data, from the missing table.

Also, the restoration device 100 may extract the second event defining the non-missing operational data, as the candidate data. That is, the restoration device 100 may extract the second event, which corresponds to the second resource and which defines the non-missing operational data, from the missing table.

To use FIG. 2 for an example, the restoration device 100 may search for the second resource "R1 R2 R3 R4 R5" of the non-missing operational data, which is organized to be the same as the first resource "R1 R2 R3 R4 R5" of the operational data, from the missing table and may extract the second event "E1 E2 E3 E4" defining the found second resource "R1 R2 R3 R4 R5" as candidate data.

Afterwards, the restoration device 100 may assign a score to each of a plurality of unit events in the second event, depending on the degree of coincidence with the first event. That is, the restoration device 100 may compare the first event and the second event for each unit event, and may assign a score to the unit event in the second event, in the method of assigning "1" point in the case of coincidence or assigning "0" points in the case of discordance.

In FIG. 2, the restoration device 100 may assign "0" points as the missing data in the first event does not coincide with the unit event "E3" in the second event.

Afterward, the restoration device 100 includes the unit event, to which the score of "0" is assigned due to discordance, in the first event to restore the missing data. For example, in FIG. 2, the restoration device 100 may fill the missing data in the first event with the unit event "E3" in the second event, to which the score of "0" is assigned, and may allow the first event to be restored to the complete form.

In another embodiment, in the E1R1 type, when the missing data is identified in the first resource, the operational data is displayed as the type E1R1-R.

As the operational data is of the type E1R1-R, the restoration device 100 may search for the non-missing operational data, which is defined by the second event the same as the first event, from the missing table. That is, the restoration device 100 may search for the second event of the non-missing operational data, which is the same as the first event of the operational data, from the missing table.

Also, the restoration device 100 extracts the second resource constituting the non-missing operational data, as the candidate data. That is, the restoration device 100 may extract the second resource 240, which corresponds to the second event 230 and which constitutes the non-missing operational data, from the missing table.

To use FIG. 2 for an example, the restoration device 100 may search for the second event "E1 E2 E3 E4" of the non-missing operational data the same as the first event "E1 E2 E3 E4" of the operational data, from the missing table and may extract the second resource "R1 R2 R3 R4 R5" constituting the non-missing operational data defined by the found second event "E1 E2 E3 E4", as candidate data.

Afterward, the restoration device 100 may assign scores to a plurality of unit resources in the second resource, depending on the degree of the coincidence with the first resource. That is, the restoration device 100 may compare the first resource and the second resource for each unit resource, and may assign a score to the unit resource in the second resource, in the method of assigning "1" point in the case of coincidence or assigning "0" points in the case of discordance.

In FIG. 2, the restoration device 100 may assign "0" points as the missing data in the first resource does not coincide with the unit resource "R2" in the second resource.

Afterward, the restoration device 100 includes the unit resource, to which the score of "0" is assigned due to discordance, in the first resource to restore the missing data. For example, in FIG. 2, the restoration device 100 may fill the missing data in the first resource with the unit resource "R2" in the second resource, to which the score of "0" is assigned, and may allow the first resource to be restored to the complete form.

In another embodiment, in the E1R1 type, when the missing data is identified in both the first event and the first resource, the operational data is displayed as the type E1R1-A.

As the operational data is of the type E1R1-A, the restoration device 100 may search for "n" pieces of non-missing operational data, which are organized to at least include the first resource, from the missing table. That is, the restoration device 100 may search for the second resource of each of pieces of non-missing operational data at least including a unit resource without deficiency in the first resource of the operational data, from the missing table.

Also, the restoration device 100 extracts the "n" second events defining the "n" pieces of non-missing operational data, as the candidate data. That is, the restoration device 100 may extract the plurality of second events, which correspond to the plurality of second resources and which define the non-missing operational data, from the missing table.

To use FIG. 2 for an example, the restoration device 100 may search for the second resources "R1 R2 R3 R4 R5" and "R1 R3 R4 R5 R6" of two pieces of non-missing operational data, which are organized to at least include "R1 R3 R4 R5" without the deficiency, in the first resource "R1 ○ R3 R4 R5" of the operational data from the missing table and may extract the second events "E1 E2 E3 E4" and "E2 E3 E4 E5", which respectively define the found second resources "R1 R2 R3 R4 R5" and "R1 R3 R4 R5 R6", as the candidate data.

Afterwards, the restoration device 100 may assign a score to each of a plurality of unit events in the "n" second events, depending on the degree of coincidence with the first event. That is, the restoration device 100 may compare the first event and the plurality of second events for each unit event, and may assign a score to the unit event in the second events, in the method of assigning "1" point in the case of coincidence or assigning "0" points in the case of discordance.

In FIG. 2, the restoration device 100 may assign "0" points as the missing data in the first event does not coincide with the unit event "E3" in the second event.

Afterward, the restoration device 100 includes the unit event, to which the score of "0" is assigned in all the "n" second events, in the first event to restore the missing data for the first event. For example, in FIG. 2, the restoration device 100 may fill the missing data 1 in the first event with the respective unit event "E3" in the two second events, to which the score of "0" is assigned in common, and may allow the first event to be restored to the complete form.

Furthermore, the restoration device 100 may search for the non-missing operational data defined by the second event the same as the restored first event and may extract the second resource constituting the found non-missing operational data from the missing table as the candidate data.

To use FIG. 2 for an example, the restoration device 100 may search for the second event "E1 E2 E3 E4" of the non-missing operational data the same as the restored first event "E1 E2 E3 E4" of the operational data, from the missing table and may extract the second resource "R1 R2 R3 R4 R5" constituting the non-missing operational data defined by the found second event "E1 E2 E3 E4", as candidate data.

Afterward, the restoration device 100 assigns a score to each of a plurality of unit resources in the second resource depending on the degree of coincidence with the first resource and restores the missing data by including a unit resource, to which the score of "0" is assigned due to discordance, in the first resource 220. For example, in FIG. 2, the restoration device 100 may fill the missing data 2 in the first resource with the unit resource "R2" in the second resource, to which the score of "0" is assigned, and may allow the first resource to be restored to the complete form.

Furthermore, under a method for determining candidate data to be restored through an event chain according to an order in which a unit event is arranged and a method for determining candidate data to be restored through a solution set composed of unit resources, the operational data is of a type EMR1 where a single first resource is defined by a plurality of first events.

In the EMR1 type, when the missing data is identified in the plurality of first events, the operational data is displayed as the type EMR1-E.

First of all, as the operational data is of the type EMR1-E, the restoration device 100 may search for non-missing operational data, which is organized to be the same as the first resource, from the missing table. That is, the restoration device 100 may search for the second resource of the non-missing operational data, which is the same as the first resource of the operational data, from the missing table.

Also, the restoration device 100 extracts the second event defining the non-missing operational data, as the candidate data. That is, the restoration device 100 may extract the second event, which corresponds to the second resource and which defines the non-missing operational data, from the missing table.

To use FIG. 3 for an example, the restoration device 100 may search for the second resource "R1 R2 R3 R4 R5" of the non-missing operational data, which is organized to be the same as the first resource "R1 R2 R3 R4 R5" of the operational data, from the missing table and may extract the second event "E1 E2 E3 E4" defining the found second resource "R1 R2 R3 R4 R5" as candidate data.

Afterward, the restoration device 100 may identify an event chain associated with the order in which a plurality of unit events in the second event are arranged. That is, the restoration device 100 may identify a structure in which unit events are arranged in the second event, as the event chain.

In FIG. 3, the restoration device 100 may identify the event chain organized as "E1-E2-E3-E4", depending on an order in which unit events in the second event "E1 E2 E3 E4" are arranged.

Afterward, the restoration device 100 restores the missing data by arranging unit events in the first event depending on the identified event chain. For example, in FIG. 3, the restoration device 100 may fill the missing data in the plurality of first events with "E2" depending on the identified event chain E1-E2-E3-E4 to arrange "E2 E3 E4 E5" and "E1 E2 E3 E4", and thus may allow each of the plurality of first events to be restored to the complete form.

In another embodiment, in the EMR1 type, when the missing data is identified in the first resource, the operational data may be displayed as the type EMR1-R.

As the operational data is of the type EMR1-R, the restoration device 100 may search for the non-missing operational data, which is defined by the second event the same as at least one of the plurality of first events, from the missing table. That is, the restoration device 100 may search for the second event of the non-missing operational data, which is the same as the first event of the operational data, from the missing table.

Also, the restoration device 100 extracts the second resource constituting the non-missing operational data, as the candidate data. That is, the restoration device 100 may extract the second resource, which corresponds to the second event and which constitutes the non-missing operational data, from the missing table.

To use FIG. 3 for an example, the restoration device 100 may search for the second event "E1 E2 E3 E4" of the non-missing operational data the same as "E1 E2 E3 E4" among the plurality of first events "E2 E3 E4 E5" and "E1 E2 E3 E4" of the operational data, from the missing table and may extract the second resource "R1 R2 R3 R4 R5" constituting the non-missing operational data defined by the found second event "E1 E2 E3 E4", as candidate data.

Afterward, the restoration device 100 may determine the solution set composed of a plurality of unit resources in the second resource. That is, the restoration device 100 may bundle respective unit resources included in the second resource into a group to determine a solution set.

In FIG. 3, the restoration device 100 may determine the solution set "R1", "R2", {"R3", "R4", and "R5"}, which is extracted as candidate data and which is composed of unit resources in the second resource.

Also, the restoration device 100 searches for the missing unit resource among unit resources in the determined solution set and fills the first resource to restore the missing data. For example, in FIG. 3, the restoration device 100 may fill the missing data 322 in the first resource with the "R2", which is not common to the unit resource in the first resource among the solution set {"R1", "R2", "R3", "R4", "R5"} except that it is common to the unit resource in the first resource, and may allow the first resource to be restored to the complete form.

In another embodiment, in the EMR1 type, when the missing data is identified in both the plurality of first events and the first resource, the operational data may be displayed as the type EMR1-A.

As the operational data is of the type EMR1-A, the restoration device 100 may search for "n" pieces of non-missing operational data, which are organized to at least include the first resource, from the missing table. That is, the restoration device 100 may search for the second resource of each of pieces of non-missing operational data at least including a unit resource without deficiency in the first resource of the operational data, from the missing table.

Also, the restoration device 100 extracts the "n" second events defining the "n" pieces of non-missing operational data, as the candidate data. That is, the restoration device 100 may extract the plurality of second events, which correspond to the plurality of second resources and which define the non-missing operational data, from the missing table.

To use FIG. 3 for an example, the restoration device 100 may search for the second resources "R1 R2 R3 R4 R5" and "R1 R3 R4 R5 R6" of two pieces of non-missing operational data, which are organized to at least include "R1 R3 R4 R5" without the deficiency, in the first resource "R1 ○ R3 R4 R5" of the operational data from the missing table and may extract the second events "E1 E2 E3 E4" and "E2 E3 E4 E5", which respectively define the found second resources "R1 R2 R3 R4 R5" and "R1 R3 R4 R5 R6, as the candidate data.

Afterward, the restoration device 100 may identify "n" event chains associated with the order in which a plurality of unit events in the "n" second events are arranged. In FIG. 3, the restoration device 100 may identify the event chain organized as "E1-E2-E3-E4", depending on an order in which unit events in the second event "E1 E2 E3 E4" are arranged; furthermore, the restoration unit 130 may identify the event chain organized as "E2-E3-E4-E5", depending on an order in which unit events in the second event "E2-E3-E4-E5" are arranged.

Furthermore, the restoration device 100 may connect the "n" event chains to build the combination event chain. In FIG. 3, the restoration device 100 may connect the identified E1-E2-E3-E4 and E2-E3-E4-E5 based on the common E2-E3-E4 to build the combination event chain E1-E2-E3-E4-E5.

Afterward, the restoration device 100 restores the missing data for the first event by arranging unit events in the first event 310 depending on the built combination event chain. In FIG. 3, the restoration device 100 may fill the missing data 1 in the plurality of first events with "E2" depending on the built combination event chain E1-E2-E3-E4-E5 to arrange "E2 E3 E4 E5" and "E1 E2 E3 E4", and thus may allow each of the plurality of first events to be restored to the complete form.

Furthermore, the restoration device 100 may search for the non-missing operational data defined by the second event the same as at least one of the restored first events and may extract the second resource constituting the found non-missing operational data from the missing table as the candidate data.

To use FIG. 3 for an example, the restoration device 100 may search for "E1 E2 E3 E4" the same as the second event of the non-missing operational data among the restored first events "E2 E3 E4 E5" and "E1 E2 E3 E4" of the operational data, from the missing table and may extract the second resource "R1 R2 R3 R4 R5" constituting the non-missing operational data defined by the found second event "E1 E2 E3 E4", as candidate data.

Afterward, the restoration device 100 may determine the solution set composed of a plurality of unit resources in the second resource. In FIG. 3, the restoration device 100 may determine the solution set {"R1", "R2", "R3", "R4", and "R5"}, which is extracted as candidate data and which is composed of unit resources in the second resource.

Also, the restoration device 100 may search for the missing unit resource among unit resources in the determined solution set and may fill the first resource to restore the missing data for the first resource. For example, in FIG. 3, the restoration device 100 may fill the missing data 2 in the first resource with the "R2", which is not common to the unit resource in the first resource among the solution set "R1", "R2", "R3", "R4", "R5"1 except that it is common to the unit resource in the first resource, and may allow the first resource to be restored to the complete form.

According to an example embodiment, the operational data is of a type E1RM where a plurality of first resources are defined by a single first event.

In the E1RM type, when the missing data is identified in the single first event, the operational data is displayed as the type E1RM-E.

First of all, as the operational data is of the type E1RM-E, the restoration device 100 may search for "n" pieces of non-missing operational data, which are organized to be the same as the plurality of first resources, from the missing table. That is, the restoration device 100 may search for a plurality of second resources of the non-missing operational data, which are respectively the same as the plurality of first resources of the operational data, from the missing table.

Also, the restoration device 100 extracts the "n" second events defining the "n" pieces of non-missing operational data, as the candidate data. That is, the restoration device 100 may extract the plurality of second events, which correspond to the plurality of second resources and which define the non-missing operational data, from the missing table.

To use FIG. 4 for an example, the restoration device 100 may search for the two second resources "R1 R2 R3 R4 R5" and "R1 R3 R4 R5 R6" of the non-missing operational data, which are organized to be the same as the two first resources "R1 R2 R3 R4 R5" and "R1 R3 R4 R5 R6" of the operational data, from the missing table and may extract the two second events "E1 E2 E3 E4" and "E2 E3 E4 E5", which respectively define the two found second resources "R1 R2 R3 R4 R5" and "R1 R3 R4 R5 R6, as candidate data.

Afterward, the restoration device 100 may identify "n" event chains associated with the order in which a plurality of unit events in the second event are arranged, with respect to each of the "n" second events. In FIG. 4, the restoration device 100 may identify the event chain organized as "E1-E2-E3-E4", depending on an order in which unit events in the second event "E1 E2 E3 E4" are arranged; furthermore, the restoration unit 130 may identify the event chain organized as "E2-E3-E4-E5" depending on an order in which unit events in the second event "E2-E3-E4-E5" are arranged.

Furthermore, the restoration device 100 may connect the "n" event chains to build the combination event chain. In FIG. 4, the restoration device 100 may connect the identified E1-E2-E3-E4 and E2-E3-E4-E5 based on the common E2-E3-E4 to build the combination event chain E1-E2-E3-E4-E5.

Afterward, the restoration device 100 restores the missing data for the first event by arranging unit events in the first event 310 depending on the built combination event chain. In FIG. 4, the restoration device 100 may fill the missing data 1 in the first event with "E2" depending on the built combination event chain E1-E2-E3-E4-E5 to arrange "E1 E2 E3 E4", and thus may allow the first event to be restored to the complete form.

In another embodiment, in the E1RM type, when the missing data is identified in the plurality of first resources, the operational data is displayed as the type E1RM-R.

As the operational data is of the type E1RM-R, the restoration device 100 may search for the non-missing operational data, which is defined by the second event the same as the first event, from the missing table. Also, the restoration device 100 extracts the second resource constituting the non-missing operational data, as the candidate data.

To use FIG. 4 for an example, the restoration device 100 may search for the second event "E1 E2 E3 E4" of the non-missing operational data the same as the first event "E1 E2 E3 E4" of the operational data, from the missing table and may extract the second resource "R1 R2 R3 R4 R5" constituting the non-missing operational data defined by the found second event "E1 E2 E3 E4", as candidate data.

Afterward, the restoration device 100 may determine the solution set composed of a plurality of unit resources in the second resource. In FIG. 4, the restoration device 100 may determine the solution set {"R1", "R2", "R3", "R4", and "R5"}, which is extracted as candidate data and which is composed of unit resources in the second resource.

Also, the restoration device 100 searches for the missing unit resource among unit resources in the determined solution set and fills the first resource to restore the missing data. For example, in FIG. 4, the restoration device 100 may fill the missing data in the first resource with the "R2", which is not common to the unit resource in the first resource among the solution set {"R1", "R2", "R3", "R4", "R5"} except that it is common to the unit resource in the first resource, and may allow the first resource to be restored to the complete form.

In another embodiment, in the E1RM type, when the missing data is identified in both the single first event and the plurality of first resources, the operational data is displayed as the type E1RM-A.

As the operational data is of the type E1RM-A, the restoration device 100 may search for "n" pieces of non-missing operational data, which are organized to be at least the same as the plurality of first resources, from the missing table. That is, the restoration device 100 may search for the second resource of each of pieces of non-missing operational data at least including a unit resource without deficiency in the plurality of first resources of the operational data, from the missing table.

Also, the restoration device 100 extracts the "n" second events defining the "n" pieces of non-missing operational data, as the candidate data. That is, the restoration device 100 may extract the plurality of second events, which correspond to the plurality of second resources and which define the non-missing operational data, from the missing table.

To use FIG. 4 for an example, the restoration device 100 may search for the second resources "R1 R2 R3 R4 R5" and "R1 R3 R4 R5 R6" of two pieces of non-missing operational data, which are organized to at least identically include "R1 R3 R4 R5" without the deficiency, in the two first resources "R1 ○ R3 R4 R5" and "R1 R3 R4 R5 R6" of the operational data from the missing table and may extract the second events "E1 E2 E3 E4" and "E2 E3 E4 E5", which respectively define the found second resources "R1 R2 R3 R4 R5" and "R1 R3 R4 R5 R6", as the candidate data.

Afterward, the restoration device 100 may identify "n" event chains associated with the order in which a plurality of unit events in the "n" second events are arranged. In FIG. 4, the restoration device 100 may identify the event chain organized as "E1-E2-E3-E4", depending on an order in which unit events in the second event "E1 E2 E3 E4" are arranged; furthermore, the restoration unit 130 may identify the event chain organized as "E2-E3-E4-E5", depending on an order in which unit events in the second event "E2-E3-E4-E5" are arranged.

Furthermore, the restoration device 100 may connect the "n" event chains to build the combination event chain. In FIG. 4, the restoration device 100 may connect the identified E1-E2-E3-E4 and E2-E3-E4-E5 based on the common E2-E3-E4 to build the combination event chain E1-E2-E3-E4-E5.

Afterward, the restoration device 100 restores the missing data for the first event by arranging unit events in the first event 310 depending on the built combination event chain. In FIG. 4, the restoration device 100 may fill the missing data 1 in the first event with "E2" depending on the built combination event chain E1-E2-E3-E4-E5 to arrange "E1 E2 E3 E4", and thus may allow the first event to be restored to the complete form.

Furthermore, the restoration device 100 may search for the non-missing operational data defined by the second event the same as the restored first event and may extract the second resource constituting the found non-missing operational data from the missing table as the candidate data.

To use FIG. 4 for an example, the restoration device 100 may search for the second event "E1 E2 E3 E4" of the non-missing operational data the same as the restored first event "E1 E2 E3 E4" of the operational data, from the missing table and may extract the second resource "R1 R2 R3 R4 R5" constituting the non-missing operational data defined by the found second event "E1 E2 E3 E4", as candidate data.

Afterward, the restoration device 100 may determine the solution set composed of a plurality of unit resources in the second resource. In FIG. 4, the restoration device 100 may determine the solution set {"R1", "R2", "R3", "R4", and "R5"}, which is extracted as candidate data and which is composed of unit resources in the second resource.

Also, the restoration device 100 may search for the missing unit resource among unit resources in the determined solution set and may fill the first resource to restore the missing data for the first resource. For example, in FIG. 4, the restoration device 100 may fill the missing data 2 in the first resource with the "R2", which is not common to the unit resource in the first resource among the solution set "R1", "R2", "R3", "R4", "R5"1 except that it is common to the unit resource in the first resource, and may allow the first resource to be restored to the complete form.

According to an example embodiment, the operational data is of a type EMRM where a plurality of first resources are defined by a plurality of first events.

In the EMRM type, when the missing data is identified in the plurality of first events, the operational data is displayed as the type EMRM-E.

First of all, as the operational data is of the type EMRM-E, the restoration device 100 may search for "n" pieces of non-missing operational data, which are organized to be the same as the plurality of first resources, from the missing table. That is, the restoration device 100 may search for a plurality of second resources of the non-missing operational data, which are respectively the same as the plurality of first resources of the operational data, from the missing table.

Also, the restoration device 100 extracts the "n" second events defining the "n" pieces of non-missing operational data, as the candidate data. That is, the restoration device 100 may extract the plurality of second events, which correspond to the plurality of second resources and which define the non-missing operational data, from the missing table.

To use FIG. 5 for an example, the restoration device 100 may search for the two second resources "R1 R2 R3 R4 R5" and "R1 R3 R4 R5 R6" of the non-missing operational data, which are organized to be the same as the two first resources "R1 R2 R3 R4 R5" and "R1 R3 R4 R5 R6" of the operational data, from the missing table and may extract the two second events "E1 E2 E3 E4" and "E2 E3 E4 E5", which respectively define the two found second resources "R1 R2 R3 R4 R5" and "R1 R3 R4 R5 R6", as candidate data.

Afterward, the restoration device 100 may identify "n" event chains associated with the order in which a plurality of unit events in the second event are arranged, with respect to each of the "n" second events. In FIG. 5, the restoration device 100 may identify the event chain organized as "E1-E2-E3-E4", depending on an order in which unit events in the second event "E1 E2 E3 E4" are arranged; furthermore, the restoration unit 130 may identify the event chain organized as "E2-E3-E4-E5", depending on an order in which unit events in the second event "E2-E3-E4-E5" are arranged.

Furthermore, the restoration device 100 may connect the "n" event chains to build the combination event chain. In FIG. 5, the restoration device 100 may connect the identified E1-E2-E3-E4 and E2-E3-E4-E5 based on the common E2-E3-E4 to build the combination event chain E1-E2-E3-E4-E5.

Afterward, the restoration device 100 restores the missing data for the first event by arranging unit events in the first event 310 depending on the built combination event chain. In FIG. 5, the restoration device 100 may fill the missing data 1 in the plurality of first events with "E2" depending on the built combination event chain E1-E2-E3-E4-E5 to arrange "E2 E3 E4 E5" and "E1 E2 E3 E4", and thus may allow the plurality of first events to be restored to the complete form.

In another embodiment, in the EMRM type, when the missing data is identified in the plurality of first resources, the operational data is displayed as the type EMRM-R.

As the operational data is of the type EMRM-R, the restoration device 100 may search for the "n" pieces of non-missing operational data, which are defined by the "n" second events the same as the plurality of first events, from the missing table. That is, the restoration device 100 may search for the second event of the plurality of non-missing operational data, each of which is the same as the first event of the operational data, from the missing table.

Also, the restoration device 100 extracts the "n" second resources constituting the "n" pieces of non-missing operational data, as the candidate data. That is, the restoration device 100 may extract the plurality of second resources, each of which corresponds to the second event and each of which constitutes the non-missing operational data, from the missing table.

To use FIG. 5 for an example, the restoration device 100 may search for the second event "E2 E3 E4 E5" of the non-missing operational data the same as the first event "E2 E3 E4 E5" of the operational data, from the missing table and may extract the second resource "R1 R3 R4 R5 R6" constituting the non-missing operational data defined by the found second event "E2 E3 E4 E5", as candidate data. Moreover, the restoration device 100 may search for the second event "E1 E2 E3 E4" of the non-missing operational data the same as the other first event "E1 E2 E3 E4" of the operational data, from the missing table and may extract the second resource "R1 R2 R3 R4 R5" constituting the non-missing operational data defined by the found second event "E1 E2 E3 E4", as candidate data.

Afterward, the restoration device 100 may determine the solution set composed of a plurality of unit resources in the "n" second resources. That is, the restoration device 100 may bundle respective unit resources included in the second resource into a group to determine a solution set.

In FIG. 5, the restoration device 100 may determine the solution sets {"R1", "R3", "R4", "R5", "R6"} and {"R1", "R2", "R3", "R4", "R5"}, each of which is extracted as candidate data and each of which is composed of unit resources in the second resource.

Also, the restoration device 100 searches for the missing unit resource among unit resources in the determined solution set and fills the first resource to restore the missing data. For example, in FIG. 5, the restoration device 100 may fill the missing data in the first resource with the "R2", which is not common to the unit resource in the first resource among the solution set {"R1", "R2", "R3", "R4", "R5"} except that it is common to the unit resource in the first resource, and may allow the first resource to be restored to the complete form. At this time, as another solution set "R1", "R3", "R4", "R5", "R6"1 is common to all unit resources "R1", "R3", "R4", "R5", "R6" in the first resource, another solution set "R1", "R3", "R4", "R5", "R6" does not participate in a restoration operation.

In another embodiment, in the EMRM type, when the missing data is identified in both the plurality of first events and the plurality of first resources, the operational data is displayed as the type EMR1-A.

As the operational data is of the type EMRM-A, the restoration device 100 may search for "n" pieces of non-missing operational data, which are organized to at least include the plurality of first resources, from the missing table. That is, the restoration device 100 may search for the second resource of each of pieces of non-missing operational data at least including a unit resource without deficiency in the first resource of the operational data, from the missing table.

Also, the restoration device 100 extracts the "n" second events defining the "n" pieces of non-missing operational data, as the candidate data. That is, the restoration device 100 may extract the plurality of second events, which correspond to the plurality of second resources and which define the non-missing operational data, from the missing table.

To use FIG. 5 for an example, the restoration device 100 may search for the second resources "R1 R2 R3 R4 R5" and "R1 R3 R4 R5 R6" of two pieces of non-missing operational data, which are organized to at least include "R1 R3 R4 R5", which do not have the deficiency and are common in the first resource "R1 ○ R3 R4 R5" and "R1 R3 R4 R5 R6" of the operational data from the missing table and may extract the second events "E1 E2 E3 E4" and "E2 E3 E4 E5", which respectively define the found second resources "R1 R2 R3 R4 R5" and "R1 R3 R4 R5 R6", as the candidate data.

Afterward, the restoration device 100 may identify "n" event chains associated with the order in which a plurality of unit events in the "n" second events are arranged. In FIG. 5, the restoration device 100 may identify the event chain organized as "E1-E2-E3-E4", depending on an order in which unit events in the second event "E1 E2 E3 E4" are arranged; furthermore, the restoration unit 130 may identify the event chain organized as "E2-E3-E4-E5", depending on an order in which unit events in the second event "E2-E3-E4-E5" are arranged.

Furthermore, the restoration device 100 may connect the "n" event chains to build the combination event chain. In FIG. 5, the restoration device 100 may connect the identified E1-E2-E3-E4 and E2-E3-E4-E5 based on the common E2-E3-E4 to build the combination event chain E1-E2-E3-E4-E5.

Afterward, the restoration device 100 restores the missing data for the first event by arranging unit events in the first event 310 depending on the built combination event chain. In FIG. 5, the restoration device 100 may fill the missing data 1 in the plurality of first events with "E2" depending on the built combination event chain E1-E2-E3-E4-E5 to arrange "E2 E3 E4 E5" and "E1 E2 E3 E4", and thus may allow each of the plurality of first events to be restored to the complete form.

Furthermore, the restoration device 100 may search for the non-missing operational data defined by the second event the same as at least one of the restored first events and may extract the second resource constituting the found non-missing operational data from the missing table as the candidate data.

To use FIG. 5 for an example, the restoration device 100 may search for "E1 E2 E3 E4" the same as the second event "E1 E2 E3 E4" of the non-missing operational data among the restored first events "E2 E3 E4 E5" and "E1 E2 E3 E4" of the operational data, from the missing table and may extract the second resource "R1 R2 R3 R4 R5" constituting the non-missing operational data defined by the found second event "E1 E2 E3 E4", as candidate data.

Afterward, the restoration device 100 may determine the solution set composed of a plurality of unit resources in the second resource. In FIG. 5, the restoration device 100 may determine the solution set {"R1", "R2", "R3", "R4", and "R5"}, which is extracted as candidate data and which is composed of unit resources in the second resource.

Also, the restoration device 100 may search for the missing unit resource among unit resources in the determined solution set and may fill the first resource to restore the missing data for the first resource. For example, in FIG. 5, the restoration device 100 may fill the missing data 2 in the first resource with the "R2", which is not common to the unit resource in the first resource among the solution set {"R1", "R2", "R3", "R4", "R5"} except that it is common to the unit resource in the first resource, and may allow the first resource to be restored to the complete form.

According to an example embodiment, in operational data including events and resources, it is possible to provide a method and a device for restoring missing operational data that select candidate data required to restore missing data depending on a form in which a resource is defined by an event and a location where missing data is identified.

Furthermore, according to an example embodiment, it is possible to restore the missing data by deriving the distribution of the entire data set based on data characteristics and substituting data, which occurs stochastically, multiple times.

Moreover, it is possible to determine a data range capable of being used for input, enter missing data, and perform evaluation to enable the accurate restoration of data.

The methods according to the above-described exemplary embodiments may be recorded in computer-readable media including program instructions to implement various operations embodied by a computer. The computer-readable medium may also include the program instructions, data files, data structures, or a combination thereof. The program instructions recorded in the media may be designed and configured specially for the exemplary embodiments or be known and available to those skilled in computer software. The computer-readable medium may include hardware devices, which are specially configured to store and execute program instructions, such as magnetic media (e.g., a hard disk, a floppy disk, or a magnetic tape), optical recording media (e.g., CD-ROM and DVD), magneto-optical media (e.g., a floptical disk), read only memories (ROMs), random access memories (RAMs), and flash memories. Examples of computer instructions include not only machine language codes created by a compiler, but also high-level language codes that are capable of being executed by a computer by using an interpreter or the like. The described hardware devices may be configured to act as one or more software modules to perform the operations of the above-described exemplary embodiments, or vice versa.

Software may include computer programs, codes, instructions or one or more combinations thereof and configure a processing unit to operate in a desired manner or independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and be stored or executed in a dispersion manner Software and data may be recorded in one or more computer-readable storage media.

Even though the embodiments are described with reference to restricted drawings, it may be obvious to one skilled in the art that the embodiments are variously changed or modified based on the above description. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

According to an example embodiment, in operational data including events and resources, it is possible to provide a method and a device for restoring missing operational data that select candidate data required to restore missing data depending on a form in which a resource is defined by an event and a location where missing data is identified.

Furthermore, according to an example embodiment, it is possible to restore the missing data by deriving the distribution of the entire data set based on data characteristics and substituting data, which occurs stochastically, multiple times.

Moreover, it is possible to determine a data range capable of being used for input, enter missing data, and perform evaluation to enable the accurate restoration of data.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method for restoring missing operational data, the method comprising:
  determining which one of three locations missing data is identified in, wherein the three locations are 1) a first event in a header area of operational data, 2) a first resource in the body area of the operational data, and 3) both the first event and the first resource, wherein the first even is activity using the first resource;
  determining which one of four forms related to number of the first resource and the first event, wherein the four forms are 1) a form in which the first resource is provided in singular and the first event is provided in singular, 2) a form in which the first resource is provided in singular and the first event is provided in plural, 3) a form in which the first resource is provided in plural and the first event is provided in singular, and 4) a form in which the first resource is provided in plural and the first event is provided in plural;
  extracting candidate data from a missing table, depending on a combination of 1) the determined form of the four forms related to the number of the first resource and the first event and 2) the determined location where the missing data is identified; and
  processing the candidate data to restore the missing data, based on at least one restoration scheme selected from three restoration schemes, wherein the three restoration schemes are 1) a scheme of comparing one or more events or one or more resources in operational data and non-missing operational data one-to-one and assigning scores depending on a degree of coincidence to determine candidate data to be restored, 2) a scheme for determining the candidate data to be restored through an event chain according to an order in which unit events are arranged, and 3) a scheme for determining the candidate data to be restored through a solution set composed of unit resources,
  wherein the at least one restoration scheme is selected based on the combination of 1) the determined form of the four forms related to the number of the first resource and the first event and 2) the determined location where the missing data is identified.

2. The method of claim 1, wherein, based on determining that the first resource is provided in singular and the first event that is provided in singular and the missing data is identified in the first event, the extracting of the candidate data includes:
  searching for non-missing operational data including a second resource that is the same as the first resource, from the missing table; and
  extracting a second event of the searched non-missing operational data as the candidate data, and
  wherein the restoring of the missing data includes:
  assigning a score to each of a plurality of unit events in the second event depending on a degree of coincidence of the second event with the first event; and
  restoring the missing data depending on the score.

3. The method of claim 1, wherein, based on determining that the first resource is provided in singular and the first event is provided in singular and the missing data is identified in the first resource, the extracting of the candidate data includes:
  searching for non-missing operational data including a second event that is the same as the first event from the missing table; and
  extracting a second resource of the searched non-missing operational data as the candidate data, and
  wherein the restoring of the missing data includes:
  assigning a score to each of a plurality of unit resources in the second resource depending on a degree of coincidence with the first resource; and
  restoring the missing data depending on the score.

4. The method of claim 1, wherein, based on determining that the first resource is provided in singular and the first event is provided in singular and the missing data is identified in both the first event and the first resource, the extracting of the candidate data includes:
  searching for "n" pieces of non-missing operational data including at least part of the first resource, from the missing table, wherein the "n" is a natural number more than two; and
  extracting "n" second events as the candidate data, each of "n" second events being included in each of the "n" pieces of non-missing operational data, and
  wherein the restoring of the missing data includes:
  assigning first scores to each of a plurality of unit events in the "n" second events depending on a degree of coincidence with the first event to restore missing data for the first event depending on the first scores;
  extracting a second resource of non-missing operational data including a second event that is the same as the restored first event as the candidate data; and
  assigning second scores to each of a plurality of unit resources in the second resource depending on a degree of coincidence with the first resource to restore missing data for the first resource depending on the second scores.

5. The method of claim 1, wherein, based on determining that the first resource is provided in singular and the first event is provided in plural and the missing data is identified in the first events, the extracting of the candidate data includes:
  searching for non-missing operational data including a second resource that is the same as the first resource, from the missing table; and
  extracting a second event of the searched non-missing operational data as the candidate data, and
  wherein the restoring of the missing data includes:
  identifying an event chain associated with an order in which a plurality of unit events in the second event are arranged; and
  restoring the missing data by arranging unit events in the first events depending on the identified event chain.

6. The method of claim 1, wherein, based on determining that the first resource is provided in singular and the first event is provided in plural, and the missing data is identified in the first resource, the extracting of the candidate data includes:
  searching for non-missing operational data including a second event that is the same as at least one of the first events from the missing table; and
  extracting a second resource of the searched non-missing operational data as the candidate data, and
  wherein the restoring of the missing data includes:
  determining a solution set composed of a plurality of unit resources in the second resource; and restoring the missing data by searching for a missing unit resource among unit resources in the determined solution set to fill the first resource.

7. The method of claim 1, wherein, based on determining that the first resource is provided in singular and the first event provided in plural and the missing data is identified in both the first events and the first resource, the extracting of the candidate data includes:
- searching for "n" pieces of non-missing operational data including at least part of the first resource, from the missing table; and
- extracting "n" second events as the candidate data, each "n" second events being included in each of the "n" pieces of non-missing operational data, and
wherein the restoring of the missing data includes:
- identifying "n" event chains associated with an order in which a plurality of unit events in a second event are arranged, with respect to each of the "n" second events;
- connecting the "n" event chains to build a combination event chain;
- restoring missing data for the first events by arranging unit events in the first events depending on the built combination event chain;
- extracting a second resource of non-missing operational data including the second event that is the same as at least one of the restored first events as the candidate data, determining a solution set composed of a plurality of unit resources in the second resource; and
- restoring missing data for the first resource by searching for a missing unit resource among unit resources in the determined solution set to fill the first resource.

8. The method of claim 1, wherein, based on determining that the first resource is provided in plural and the first event provided in singular and the missing data is identified in the first event, the extracting of the candidate data includes:
- searching for "n" pieces of non-missing operational data including the second resource that are the same as at least one of the plurality of first resources, from the missing table; and
- extracting "n" second events of the "n" pieces of non-missing operational data as the candidate data, each "n" second events being included in each of the "n" pieces of non-missing operational data, and
wherein the restoring of the missing data includes:
- identifying "n" event chains associated with an order in which a plurality of unit events in a second event are arranged, with respect to each of the "n" second events;
- connecting the "n" event chains to build a combination event chain; and
- restoring missing data for the first event by arranging unit events in the first event depending on the built combination event chain.

9. The method of claim 1, wherein, based on determining that the first resource is provided in plural and the first event is provided in singular and the missing data is identified in the first resource, the extracting of the candidate data includes:
- searching for non-missing operational data including a second event that is the same as the first event from the missing table; and
- extracting a second resource of the searched non-missing operational data as the candidate data, and
wherein the restoring of the missing data includes:
- determining a solution set composed of a plurality of unit resources in the second resource; and restoring the missing data by searching for a missing unit resource among unit resources in the determined solution set to fill the first resource.

10. The method of claim 1, wherein, based on determining that the first resource is provided in plural and the first event is provided in singular and the missing data is identified in both the first event and the first resources, the extracting of the candidate data includes:
- searching for "n" pieces of non-missing operational data including at least part of at least one of the first resources, from the missing table; and
- extracting "n" second events the candidate data, each of "n" second events being included in each of the "n" pieces of non-missing operational data, and
wherein the restoring of the missing data includes:
- identifying "n" event chains associated with an order in which a plurality of unit events in a second event are arranged, with respect to each of the "n" second events;
- connecting the "n" event chains to build a combination event chain;
- restoring missing data for the first event by arranging unit events in the first event depending on the built combination event chain;
- extracting a second resource of non-missing operational data including the second event that is the same as the restored first event as the candidate data;
- determining a solution set composed of a plurality of unit resources in the second resource; and
- restoring missing data for the first resources by searching for a missing unit resource among unit resources in the determined solution set to fill the first resources.

11. The method of claim 1, wherein, based on determining that the first resource is provided in plural and the first event is provided in plural, and the missing data is identified in the first events, the extracting of the candidate data includes:
- searching for "n" pieces of non-missing operational data including a second resource that are the same as at least of the first resources, from the missing table; and
- extracting "n" second events as the candidate data, each of "n" second events being included in each of the "n" pieces of non-missing operational data, and
wherein the restoring of the missing data includes:
- identifying "n" event chains associated with an order in which a plurality of unit events in a second event are arranged, with respect to each of the "n" second events;
- connecting the "n" event chains to build a combination event chain; and
- restoring missing data for the first events by arranging unit events in the first events depending on the built combination event chain.

12. The method of claim 1, wherein, based on determining that the first resource is provided in plural and the first event is provided in plural and the missing data is identified in the first resources, the extracting of the candidate data includes:
- searching for "n" pieces of non-missing operational data including "n" second events from the missing table, each of "n" second events being included in each of the "n" pieces of non-missing operational data and being the same as at least one of the first events; and
- extracting "n" second resources as the candidate data, each of "n" second events being included in each of the "n" pieces of non-missing operational data, and
wherein the restoring of the missing data includes:
- determining a solution set composed of a plurality of unit resources in the "n" second resources; and restoring the missing data by searching for a missing unit resource among unit resources in the determined solution set to fill the first resources.

13. The method of claim 1, wherein, based on determining that the first resource is provided in plural and the first event is provided in plural and the missing data is identified in both the first events and the first resources, the extracting of the candidate data includes:
searching for "n" pieces of non-missing operational data including at least part of at least one of the first resources, from the missing table; and
extracting "n" second events as the candidate data, each of "n" second events being included in each of the "n" pieces of non-missing operational data, and
wherein the restoring of the missing data includes:
identifying "n" event chains associated with an order in which a plurality of unit events in a second event are arranged, with respect to each of the "n" second events;
connecting the "n" event chains to build a combination event chain;
restoring missing data for the first events by arranging unit events in the first events depending on the built combination event chain;
extracting "n" second resources of non-missing operational data including the second event that is the same as at least one of the restored first events as the candidate data;
determining a solution set composed of a plurality of unit resources in the "n" second resources; and
restoring missing data for the first resources by searching for a missing unit resource among unit resources in the determined solution set to fill the first resources.

14. A restoration device of missing operational data, the device comprising:
a check processor configured to determine which one of three locations missing data is identified in, wherein the three locations are 1) a first event in a header area of operational data, 2) a first resource in a body area of the operational data, and 3) both the first event and the first resource, and configured to determine which one of four forms related to number of the first resource and the first event, wherein the four forms are 1) a form in which the first resource is provided in singular and first event is provided in singular, 2) a form in which the first resource is provided in singular and the first event is provided in plural, 3) a form in which the first resource is provided in plural and the first event is provided in singular, and 4) a form in which the first resource is provided in plural and the first event is provided in plural;
an extraction processor configured to extract candidate data from a missing table, depending on a combination of 1) the determined form related to the number of the first resource and the first event and 2) the determined location where the missing data is identified; and
a restoration processor configured to process the candidate data to restore the missing data, based on at least one restoration scheme selected from three restoration schemes, wherein the three restoration schemes are 1) a scheme of comparing one or more events or one or more resources in operational data and non-missing operational data one-to-one and assigning scores depending on a degree of coincidence to determine candidate data to be restored, 2) a scheme for determining the candidate data to be restored through an event chain according to an order in which unit events are arranged, and 3) a scheme for determining the candidate data to be restored through a solution set composed of unit resources,
wherein the at least one restoration scheme is selected based on the combination of 1) the determined form related to the number of the first resource and the first event and 2) the determined location where the missing data is identified,
wherein the first event is activity using the first resource.

15. The device of claim 14, wherein, based on determining that the first resource is provided in singular and the first event is provided in singular and the missing data is identified in both the first event and the first resource, the extraction processor is configured to:
search for "n" pieces of non-missing operational data including at least part of the first resource, from the missing table; and
extract "n" second events as the candidate data, each of "n" second events being included in each of the "n" pieces of non-missing operational data, and
wherein the restoration processor is configured to:
assign first score to each of a plurality of unit events in the "n" second events depending on a degree of coincidence with the first event to restore missing data for the first event depending on the first scores; and
extract a second resource of non-missing operational data including a second event that is the same as the restored first event as the candidate data; and
assign second scores to each of a plurality of unit resources in the second resource depending on a degree of coincidence with the first resource to restore missing data for the first resource depending on the second scores.

16. The device of claim 14, wherein, based on determining that the first resource is provided in singular and the first event is provided in plural and the missing data is identified in both the first events and the first resource, the extraction processor is configured to:
search for "n" pieces of non-missing operational data including at least part of the first resource, from the missing table; and
extract "n" second events as the candidate data, each of "n" second events being included in each of the "n" pieces of non-missing operational data, and
wherein the restoration processor is configured to:
identify "n" event chains associated with an order in which a plurality of unit events in a second event are arranged, with respect to each of the "n" second events;
connect the "n" event chains to build a combination event chain;
restore missing data for the first events by arranging unit events in the first events depending on the built combination event chain;
extract a second resource of non-missing operational data including the second event that is the same as at least one of the restored first events as the candidate data;
determine a solution set composed of a plurality of unit resources in the second resource; and
restore missing data for the first resource by searching for a missing unit resource among unit resources in the determined solution set to fill the first resource.

17. The device of claim 14, wherein, based on determining that the first resource is provided in plural and the first event is provided in singular and the missing data is identified in both the first event and the first resources, the extraction processor is configured to:

search for "n" pieces of non-missing operational data including at least part of at least one of the first resources, from the missing table; and extract "n" second events as the candidate data, each of "n" second events being included in each of the "n" pieces of non-missing operational data, and wherein the restoration processor is configured to:

identify "n" event chains associated with an order in which a plurality of unit events in a second event are arranged, with respect to each of the "n" second events;

connect the "n" event chains to build a combination event chain;

restore missing data for the first event by arranging unit events in the first event depending on the built combination event chain;

extract a second resource of non-missing operational data including the second event that is the same as the restored first event as the candidate data;

determine a solution set composed of a plurality of unit resources in the second resource; and restore missing data for the first resources by searching for a missing unit resource among unit resources in the determined solution set to fill the first resources.

18. The device of claim 14, wherein, based on determining that the first resource is provided in plural and the first event is provided in plural and the missing data is identified in both the first events and the first resources, the extraction processor is configured to:

search for "n" pieces of non-missing operational data including at least part of at least one of the first resources, from the missing table; and extract "n" second events as the candidate data, each of "n" second events being included in each of the "n" pieces of non-missing operational data, and wherein the restoration processor is configured to:

identify "n" event chains associated with an order in which a plurality of unit events in a second event are arranged, with respect to each of the "n" second events;

connect the "n" event chains to build a combination event chain;

restore missing data for the first events by arranging unit events in the first events depending on the built combination event chain;

extracting "n" second resources of non-missing operational data including the second event that is the same as at least one of the restored first events from the missing table as the candidate data;

determine a solution set composed of a plurality of unit resources in the "n" second resources; and restore missing data for the first resources by searching for a missing unit resource among unit resources in the determined solution set to fill the first resources.

* * * * *